(12) United States Patent
Zhu et al.

(10) Patent No.: US 12,729,794 B2
(45) Date of Patent: Sep. 8, 2026

(54) GRIPPING BODY

(71) Applicant: Baker Hughes Energy Technology UK Limited, Bristol (GB)

(72) Inventors: Linfa Zhu, Katy, TX (US); Zhimin Tan, Katy, TX (US); Everton Vieira de Almeida, Rio de Janeiro (BR); Andrew Roberts, Ouston (GB)

(73) Assignee: Baker Hughes Energy Technology UK Limited, Bristol (GB)

( * ) Notice: Subject to any disclaimer, the term of this patent is extended or adjusted under 35 U.S.C. 154(b) by 0 days.

(21) Appl. No.: 19/046,302

(22) Filed: Feb. 5, 2025

(65) Prior Publication Data

US 2025/0180149 A1 Jun. 5, 2025

Related U.S. Application Data

(62) Division of application No. 18/358,555, filed on Jul. 25, 2023, now Pat. No. 12,247,686.

(51) Int. Cl.
*F16L 55/00* (2006.01)
*F16L 11/08* (2006.01)

(52) U.S. Cl.
CPC ............. *F16L 55/00* (2013.01); *F16L 11/081* (2013.01)

(58) Field of Classification Search
CPC ........... F16L 55/00; F16L 11/081; F16L 33/01
See application file for complete search history.

(56) References Cited

U.S. PATENT DOCUMENTS 3,076,668 A 2/1963 Famely
7,781,040 B2 8/2010 Coyle
(Continued)

FOREIGN PATENT DOCUMENTS

EP 0209399 A2 1/1987
WO WO 2007/144553 12/2007
(Continued)

OTHER PUBLICATIONS

International Search Report and Written Opinion for International Application No. PCT/EP2024/025220 dated Nov. 7, 2024, 22 pages.
(Continued)

*Primary Examiner* — Lawrence Averick
(74) *Attorney, Agent, or Firm* — Knobbe, Martens, Olson & Bear, LLP

(57) ABSTRACT

A method and apparatus for locating respective end regions of wires of an armour layer of a segment of flexible pipe body at a respective desired positions in an end fitting, and apparatus for terminating a segment of flexible pipe body in an end fitting are disclosed. The method comprises providing an annular element radially around an exposed region of an armour layer, of flexible pipe body, that comprises a plurality of wires; locating the annular element against a terminal end of a first collar member disposed radially around the armour layer; bending the wires away from a longitudinal axis of the flexible pipe body against a guiding surface of the annular element, at a predetermined location; urging the annular element away from the first collar member in a first direction; and gripping the wires between an abutment region of the guiding surface and a cooperating abutment surface of a further collar member thereby locating respective end regions of the wires at respective desired positions in an end fitting.

13 Claims, 17 Drawing Sheets

(56) References Cited

U.S. PATENT DOCUMENTS

| | | | | |
|---|---|---|---|---|
| 8,515,687 | B2 | 8/2013 | Pereira | |
| 9,952,170 | B2 | 4/2018 | Upasani | |
| 10,030,793 | B2 | 7/2018 | Dodds | |
| 10,670,167 | B2 | 6/2020 | Case | |
| 11,009,152 | B2 | 5/2021 | Case | |
| 11,149,894 | B2 | 10/2021 | Carney | |
| 11,512,796 | B2 | 11/2022 | Case | |
| 11,867,323 | B2 | 1/2024 | Case | |
| 2008/0233318 | A1* | 9/2008 | Coyle | F16L 59/125 428/34.1 |
| 2010/0174495 | A1* | 7/2010 | Pereira | G01M 5/0033 702/34 |
| 2014/0007970 | A1* | 1/2014 | Dodds | B29D 23/001 156/84 |
| 2015/0177172 | A1* | 6/2015 | Upasani | F16L 11/086 324/693 |
| 2019/0226614 | A1* | 7/2019 | Carney | F16L 33/01 |
| 2019/0257445 | A1* | 8/2019 | Case | F16L 1/203 |
| 2020/0217146 | A1* | 7/2020 | Armstrong | F16L 1/235 |
| 2021/0270390 | A1 | 9/2021 | Case | |
| 2022/0341523 | A1* | 10/2022 | Harris | F16L 33/01 |
| 2022/0341808 | A1* | 10/2022 | Benirschke | F16L 11/08 |
| 2022/0390051 | A1* | 12/2022 | Clements | F16L 33/34 |
| 2023/0081347 | A1 | 3/2023 | Case | |
| 2024/0093806 | A1 | 3/2024 | Case | |
| 2025/0035246 | A1 | 1/2025 | Zhu et al. | |

FOREIGN PATENT DOCUMENTS

| | | |
|---|---|---|
| WO | WO 2014/135612 | 9/2014 |
| WO | WO 2016/170360 | 10/2017 |

OTHER PUBLICATIONS

Partial Search Report for Application No. PCT/EP2024/025220, dated Aug. 27, 2024, 13 pages.

* cited by examiner

GRIPPING BODY

INCORPORATION BY REFERENCE TO ANY PRIORITY APPLICATIONS

The present application is a divisional of U.S. patent application Ser. No. 18/358,555 filed on Jul. 25, 2023. Any and all applications for which a foreign or domestic priority claim is identified in the Application Data Sheet as filed with the present application are hereby incorporated by reference herein in their entirety and made a part of this specification.

FIELD

The present invention relates to locating respective end regions of wires of an armour layer of a segment of flexible pipe body at a respective desired positions in an end fitting. In particular, but not exclusively, the present invention relates to an annular element that includes a guiding surface against which tensile armour wires can be folded during terminating a segment of flexible pipe body in an end fitting to limit the curvature of the tensile armour wires, and that can be urged against unfolded tensile armour wires to help orient tensile armour wires in a more uniform manner (to help reduce that variation of stresses on portions of tensile armour wires located in an end fitting) and help grip respective end regions of tensile armour wires between the annular element and a collar member.

BACKGROUND

Flexible pipes are widely used in the oil and gas industry in offshore applications for the transportation of oil, gas, water, or other fluids from one location to another. Flexible pipe is particularly useful in connecting sea-level supporting structures and subsea locations (which may be deep underwater, say 1000 metres or more), where the pipe may act as a riser. A flexible pipe is generally formed as an assembly of flexible pipe body and one or more end fittings. Flexible pipe body may have an internal diameter of typically up to around 0.6 metres (e.g. diameters may range from 0.05 m up to 0.6 m). Due to their location, flexible pipes are exposed to a range of challenging conditions that may have high pressures, seawater, high tensile strain, and corrosive environments. Flexible pipe body is therefore composed of several concentric polymeric, metallic, and/or composite layers. For example, pipe body may include polymer and metal layers, or polymer and composite layers, or polymer, metal and composite layers. Layers may be formed from a single piece such as an extruded tube or by helically winding one or more wires at a desired pitch or by connecting together multiple discrete hoops that are arranged concentrically side-by-side. Depending upon the layers of the flexible pipe used and the type of flexible pipe some of the pipe layers may be bonded together or remain unbonded. The polymeric layers generally provide sealing from fluid ingress and the metallic layers structural rigidity.

Some flexible pipes have been used for deep water (less than 3,300 feet (1,005.84 metres)) and ultra-deep water (greater than 3,300 feet) developments. It is the increasing demand for oil which is causing exploration to occur at greater and greater depths (for example in excess of 8202 feet (2500 metres)) where environmental factors are more extreme. For example, in such deep and ultra-deep water environments, ocean floor temperature increases the risk of production fluids cooling to a temperature that may lead to pipe blockage. In practice, flexible pipes are conventionally designed to perform at operating temperatures of −30° C. to +130° C. and pipe body are being developed for even more extreme temperatures. Increased depths also increase the pressure associated with the environment in which the flexible pipe must operate. For example, a flexible pipe may be required to operate with external pressures ranging from 0.1 MPa to 30 MPa acting on the pipe. Equally, transporting oil, gas or water may well give rise to high pressures acting on the flexible pipe from within, for example with internal pressures ranging from zero to 140 MPa from bore fluid acting on the pipe. As a result, the need for high levels of performance and environmental resilience from certain layers such as a pipe carcass or a pressure armour or a tensile armour layer of the flexible pipe body is increased. It is noted for the sake of completeness that flexible pipe may also be used for shallow water applications (for example less than around 500 metres depth) or even for shore (overland) applications.

The innermost layers of flexible pipe body often include an inner sheath which can be an extruded non-porous polymer layer that confines a bore fluid to its internal circumference, and often a carcass, a spirally wound interlocking metal structure which forms the very innermost layer. The carcass prevents the collapse of the inner liner and also protects the liner from abrasive particles. When a carcass layer is present in the flexible pipe body, the inner sheath is referred to as a barrier layer. When a carcass layer is not present in the flexible pipe body, the inner sheath is referred to as a liner.

The outermost sealed or fluid tight layer of a flexible pipe is typically the outer sheath, an extruded non-porous polymer layer that protects the pipe's structural elements from the environment around the flexible pipe and prevents the ingress of seawater. A flexible pipe can however include additional layers located radially outside of the other sheath. These additional layers can for example include insulation layers and/or an outermost protective layer that often helps protect the outer sheath (and any insulation layers) from abrasion related damage due to contact with rough or sharp substances in the environment. The layers that are disposed radially outside of the outer sheath are typically not sealed (or fluid tight) in order to reduce the axial compression experienced by a flexible pipe in use.

For some flexible pipes that include intermediate polymer layers flexible pipe body may include multiple annuli. For most flexible pipes though only an outer and an inner polymer layer is included. An annulus of such a flexible pipe is a region between the innermost fluid containing layer and the outermost fluid containing layer. The innermost layers in the annulus region are typically pressure armour layers, which are often made of helically wound flattened metallic wires arranged at a lay angle close to 90°. Neighbouring wound wires in the pressure armour layer often interlock to control the gap between windings. Pressure armour is designed to withstand hoop stress in the pipe wall, which is caused by the bore fluid pressure. Pairs of tensile armour layers are typically also located in the annulus, and these are often cross-wound radially outside the pressure armour layer. Tensile armour layers are often made of slightly flattened rectangular metallic wires arranged at a lay angle of about 30-55°. Tensile armour layers support the weight of all internal pipe layers and transfer the resulting tensile stress to the sea-level supporting structures. The annulus may also have other layers such as anti-wear and anti-birdcaging tapes, and thermally insulating layers. Carbon steel wires in the annulus are thus often a feature of flexible pipes for subsea environments.

Conventionally in the end fitting, flexible pipe body is typically terminated by sealing and securing ends of polymer or composite layers and securing any pressure armour windings and securing the tensile armour wires. The annulus which extends along the flexible pipe body segment thus extends into a region within the end fitting. In configurations where two flexible pipes are joined end-to-end to form a pipeline there is typically no fluid connection between the annulus in one flexible pipe and the annulus in the other flexible pipe.

Traditionally flexible pipe is utilised to transport production fluids, such as oil and/or gas and/or water, from one location to another. Flexible pipe is particularly useful in connecting a sub-sea location to a sea level location. Flexible pipe is generally formed as an assembly of a portion of flexible pipe body and one or more end fittings. The pipe body is typically formed as a composite of layered materials that form a pressure-containing conduit. The pipe structure allows large deflections without causing bending stresses that impair the pipe's functionality over its lifetime. The pipe body is generally built up as a composite structure including metallic and polymer layers.

The end fittings of a flexible pipe may be used for connecting segments of flexible pipe together or for connecting them to terminal equipment such as a rigid sub-sea structures or floating facilities. As such amongst other varied uses, flexible pipe can be used to provide a riser assembly for transporting fluids from a sub-sea flow line to a floating structure. In such a riser assembly a first segment of flexible pipe may be connected to one or more further segments of flexible pipe. Each segment of flexible pipe typically includes at least one end fitting.

It is well-known that there are many varied problems associated with the provision of end fittings for ends of flexible pipe body. The end fittings must ensure both good fastening and good sealing. Particular problems occur when the various specific layers of the multi layer flexible pipe body are terminated. The flexible pipe body may include layers having very different material characteristics such as single polymer layers and/or interlocked metallic layers. The termination of each of these layers in an end fitting brings with it characteristic problems. For example, flexible pipe body typically includes a barrier layer formed generally as a polymer sheath or pressure sheath. Such a layer operates as a primary liquid retaining layer. To prevent rupture of such a layer or indeed any underlying layer under high pressure caused by the pressure of the transported fluid, an interlocked wire layer is often located outside the barrier layer. Armour layers formed by layers of wire may also be provided to sustain tensile loads and internal pressure. If a pressure armour layer is not supported along its length, it is possible for portions of the barrier layer or other such underlying layer to burst through under pressure and cause failure of the terminating structure.

When wires of one or more armour layers are terminated in an end fitting it is accepted practice to bend the armour wires away from the longitudinal axis of the flexible pipe, cut the wires to a selected length locate these end parts in a locating region and fix them in place using some sort of fixent such as epoxy resin. It has been found that when armour wires are bent away from the middle of the flexible pipe problems can occur if the radius of curvature of the wires is too small or is not controlled within predetermined parameters. Effectively the wires are overstretched and this can cause subsequent failure during the lifetime of the flexible pipe.

In addition, subsequent to bending wires of one or more amor layers away from the longitudinal axis of the flexible pipe, the wires are typically bent back towards, or allowed to flex back towards, the longitudinal axis of the flexible pipe prior to affixing the wires in a fixent such as epoxy resin. The wires however are often not uniformly arranged around the longitudinal axis of the flexible pipe when affixed in fixent and may be partially splayed radially outwardly by differing amounts (and may thus respectively make a variety of slightly different angles with the longitudinal axis of the flexible pipe). This can result in non-uniform stresses and tensions being imparted on certain wires in use and throughout the lifetime of flexible pipe which can reduce the fatigue life of the pipe. In more extreme circumstances, this can result in damage to one or more wires and can result in one or more wires being able to be pulled free from entombment in the fixent. For example, if a wire is located in a position or orientation in which there is some slack as the wire is entombed in the fixent, the wire may not be fully encapsulated by the fixent and therefore able to partially move, or cyclically alter its degree of curvature, within the constraints of the fixent, through the lifetime of a flexible pipe. Also, or alternatively, the degree of rigidity (compressive strength) of the epoxy material of which the fixent is comprised may be low enough such that there is a degree of "give" (such that locally the fixent is compressed by the wire under some loading extremes) in the fixent which may allow the wire to partially move or cyclically alter its degree of curvature through the lifetime of the flexible pipe. Some conventional methods of terminating flexible pipe body in respective end fittings can thus result in different initial stress in different wires wherein some wires have higher bending/tensile stress than the others and different structural stiffness of wires when the tensile wires are subjected to tension loads in the operation. It will thus be appreciated that one or more tensile armour wires may have, or may develop, a degree of slack which can cause problems in use.

SUMMARY

It is an aim of certain embodiments of the present invention to at least partly mitigate one or more of the above-mentioned problems.

It is an aim of certain embodiments of the present invention to reduce the variation in stresses experienced by different tensile armour wires during termination of a segment of flexible pipe body in an end fitting.

It is an aim of certain embodiments to reduce the variation in the orientation of portions of different tensile armour wires that are located within, and terminated in, an end fitting.

It is an aim of certain embodiments of the present invention to provide an annular element that is urgable against an end region of at least some tensile armour wires disposed and terminated in an end fitting to help at least partially orient the at least some tensile amour wires in similar orientation.

It is an aim of certain embodiments of the present invention to provide an end fitting that includes a mechanism for clamping respective end regions of tensile armour wires in place.

It is an aim of certain embodiments of the present invention to provide an annular element that helps grip tensile armour wires between said an annular element and a collar member of an end fitting.

It is an aim of certain embodiments of the present invention to automatically grip tensile armour wires in an end fitting between an annular element and a collar member when an end fitting jacket is provided radially around and secured to an end fitting body.

It is an aim of certain embodiments of the present invention to limit the curvature of tensile armour wires when tensile armour wires are folded or bent away from a longitudinal axis of a flexible pipe during terminating a segment of flexible pipe body in an end fitting.

According to a first aspect of the present invention there is provided a method of locating respective end regions of wires of an armour layer of a segment of flexible pipe body at respective desired positions in an end fitting, comprising the steps of: providing an annular element radially around an exposed region of an armour layer, of flexible pipe body, that comprises a plurality of wires; locating the annular element against a terminal end of a first collar member disposed radially around the armour layer; bending the wires away from a longitudinal axis of the flexible pipe body against a guiding surface of the annular element, at a predetermined location; urging the annular element away from the first collar member in a first direction; and gripping the wires between an abutment region of the guiding surface and a cooperating abutment surface of a further collar member thereby locating respective end regions of the wires at respective desired positions in an end fitting.

In certain embodiments the method further comprises, via gripping the wires between the abutment region and the abutment surface, at last partially immobilising the wires between the abutment region and the abutment surface by providing a predetermined gripping force on each of the wires.

In certain embodiments the method further comprises, via bending the wires away from the longitudinal axis of the flexible pipe body against the guiding surface, preventing a radius of curvature of each of the wires that are bent away from the longitudinal axis, at or proximate to the predetermined location, from bending each wire below a minimum bend radius of curvature associated with each of the wires.

In certain embodiments the method further comprises, subsequent to urging the annular element away from the first collar member, urging the abutment region over or against a respective end region of each of the wires thereby, subsequent to gripping the wires between the abutment region of the guiding surface and the abutment surface, limiting a variation of a radius of curvature of the wires at or proximate to the predetermined location, the variation optionally being limited to be less than around 5%.

In certain embodiments urging the annular element away from the first collar member comprises sliding the annular element along an outer surface of the armour layer along at least a portion of the exposed region.

In certain embodiments sliding the annular element along the outer surface of the armour layer comprises sliding a radially inner surface of the annular element over at least a portion of a radially outer surface provided by the armour layer.

In certain embodiments the method further comprises, via urging the annular element away from the first collar member, providing a void region between the annular element and the first collar member.

In certain embodiments providing the void region between the annular element and the first collar member comprises providing the void region between a lead surface of the first collar member and a trailing surface of the annular element that is, subsequent to urging the annular element away from the first collar member, axially spaced apart from the first collar member.

In certain embodiments the method further comprises securing a jacket element to an end fitting body thereby locating an end region of each of the wires in a cavity region located between the end fitting body and the jacket element.

In certain embodiments urging the annular element away from the first collar member comprises urging a first engaging surface region at an end region of the jacket element against a further engaging surface region of the annular element.

In certain embodiments the method further comprises, simultaneously with urging the annular element away from the first collar member, automatically locating the end fitting jacket at a desired position with respect to the end fitting body.

In certain embodiments the method further comprises, subsequent to gripping the wires between an abutment region of the guiding surface and a cooperating abutment surface of a further collar member, filling the cavity region with a curable material via at least one fluid communication passageway that extends radially through the jacket element; and/or filling the cavity region with a curable material via at least one fluid communication passageway that extends longitudinally through the end fitting body or jacket element.

In certain embodiments the method further comprises, via gripping the wires between the abutment region and the abutment surface, fluidly sealing the cavity region at or proximate to the predetermined location.

In certain embodiments the method further comprises filling the void region with a curable material via at least one radially extending fluid communication passageway that extends through the jacket.

In certain embodiments the method further comprises, prior to or at the same time as urging the annular element away from the first collar member, bending the wires back towards the longitudinal axis towards a desired position whereby a portion of each wire spanning between the predetermined location and a free terminal end of each respective wire extends along an axis that is oblique to the longitudinal axis.

According to a second aspect of the present invention there is provided apparatus for locating respective end regions of wires of an armour layer of a segment of flexible pipe body at respective desired positions in an end fitting, comprising: a rigid annular body, that extends circumferentially around a central axis and is locatable in an end fitting and against respective end regions of a plurality of armour wires of an armour layer of flexible pipe body, that has a cross section at each position where the rigid annular body intersects an imaginary plane that contains the central axis, comprising a first end region and a further end region that is spaced apart from the first end region and is connected to the first end region by a radially inner edge region of the cross section and a radially outer edge region of the cross section respectively; wherein the rigid annular body comprises a guiding surface, that in cross section extends at least partly along the radially inner edge region and/or at least partly along the first end region, that comprises at least one arcuate bend limiting surface portion, and a jacket engaging portion, that in cross section is at least partly disposed along at least part of the radially outer edge region, that provides at least one jacket engaging surface.

In certain embodiments the jacket engaging portion comprises a radially inset region that in cross section extends from the further end region partly along the radially outer edge region, or at least one radially extending protrusion.

In certain embodiments said a cross section is substantially constant around a circumference the rigid annular body.

In certain embodiments the bend limiting surface portion has a radius of curvature that is larger than a minimum bend radius associated with each of the wires; wherein in a first mode of operation a collar abutment surface, that in cross section extends at least partly along the further end region, is locatable against a first collar member and, when each of the wires are bent away from a longitudinal axis of the flexible pipe body at a predetermined location, the guiding surface is locatable at least partly against at least a portion each of the wires; and in a further mode of operation the collar abutment surface is locatable to be axially spaced apart from the first collar member via a void region, and an abutment region of the guiding surface is locatable to grip each of the wires between the abutment region and an abutment surface of a further collar member.

In certain embodiments the further end region is spaced apart from the first end region in a direction that is substantially parallel to the central axis.

In certain embodiments the apparatus further comprises a radially inner surface of the rigid annular body that comprises at least one low-friction region.

According to a third aspect of the present invention there is provided apparatus for terminating a segment of flexible pipe body in an end fitting, comprising: an outer sleeve member of an end fitting comprising an outer sleeve body portion and an outer sleeve neck portion that extends away from the outer sleeve body portion and is secured to a portion of flexible pipe body in a slotted position between an outer sheath of the flexible pipe body and at least one armour layer of the flexible pipe body; an inner collar member of an end fitting comprising an inner collar body portion and an inner collar neck portion that extends away from the inner collar body portion and comprises an abutment surface at an end region of the inner collar neck portion distal to the inner collar body portion; and an annular element that is spaced apart from the outer sleeve body portion via a void region and comprises an abutment region, that faces the abutment surface, disposed on a generally arcuate guiding surface of the annular element; wherein respective end regions of a plurality of wires of the armour layer are gripped between the abutment surface and the abutment region, the wires being at least partly locatable in a cavity region, that is fillable with a curable material, between an end fitting body and an end fitting jacket.

In certain embodiments the outer sleeve member comprises an outer collar member.

According to a fourth aspect of the present invention there is provided apparatus for locating respective end regions of wires of an armour layer of a segment of flexible pipe body at respective desired positions in an end fitting, comprising: a rigid annular body, that extends circumferentially around a central axis and is locatable in an end fitting and against respective end regions of a plurality of armour wires of an armour layer of flexible pipe body, that has a cross section, along the central axis, comprising a first end region and a further end region that is spaced apart from the first end region along the central axis and is connected to the first edge region by a radially inner edge region and a radially outer edge region respectively; wherein the rigid annular body comprises a guiding surface, that in cross section extends at least partly along the radially inner edge region and/or at least partly along the first end region, that comprises at least one arcuate bend limiting surface portion, and a jacket engaging portion, that in cross section is disposed on the radially outer edge region, that provides at least one jacket engaging surface.

According to a fifth aspect of the present invention there is provided apparatus for locating respective end regions of wires of an armour layer of a segment of flexible pipe body at respective desired positions in an end fitting, comprising: a rigid annular body, that extends circumferentially around a central axis and is locatable in an end fitting and against respective end regions of a plurality of armour wires of an armour layer of flexible pipe body, that has a cross section, along the central axis, comprising a first end region and a further end region that is spaced apart from the first end region along the central axis and is connected to the first end region by a radially inner edge region and a radially outer edge region respectively; wherein the rigid annular body comprises a guiding surface, that in cross section extends at least partly along the radially inner edge region and/or at least partly along the first end region, that comprises at least one arcuate bend limiting surface portion, and a jacket engaging portion, that in cross section is disposed on the radially outer edge region, that provides at least one jacket engaging surface.

Certain embodiments of the present invention provide a more uniform orientation of tensile armour wires in an internal cavity of an end fitting when a segment of flexible pipe body is terminated in an end fitting.

Certain embodiments of the present invention provide a more uniform distribution of stresses (including initial stresses and the like prior to filling an and fitting cavity with fixent such as epoxy resin or the like) experienced by tensile armour wires of a segment of flexible pipe body.

Certain embodiments of the present invention provide a gripped or clamped end region of tensile armour wires in an end fitting.

Certain embodiments of the present invention provide a limitation of the curvature experienced by tensile armour wires during folding or unfolding the wires during terminating a segment of flexible pipe body in an end fitting.

Certain embodiments of the present invention provide a sealed inner cavity of an end fitting which helps reduce the loss of curable fixent, such as epoxy resin, used to entomb and secure tensile armour wires in the end fitting cavity when the fixent is provided to the end fitting cavity in liquid form.

BRIEF DESCRIPTION OF THE DRAWINGS

Embodiments of the present invention will now be described hereinafter, by way of example only, with reference to the accompanying drawings in which.

In the drawings like reference numerals refer to like parts.

DETAILED DESCRIPTION

Throughout this description, reference will be made to a flexible pipe. It is to be appreciated that certain embodiments of the present invention are applicable to use with a wide variety of flexible pipe. For example, certain embodiments of the present invention can be used with respect to flexible pipe body and associated end fittings of the type which is manufactured according to API 17J. Such flexible pipe is often referred to as unbonded flexible pipe. Other embodiments are associated with other types of flexible pipe.

Figure 1:
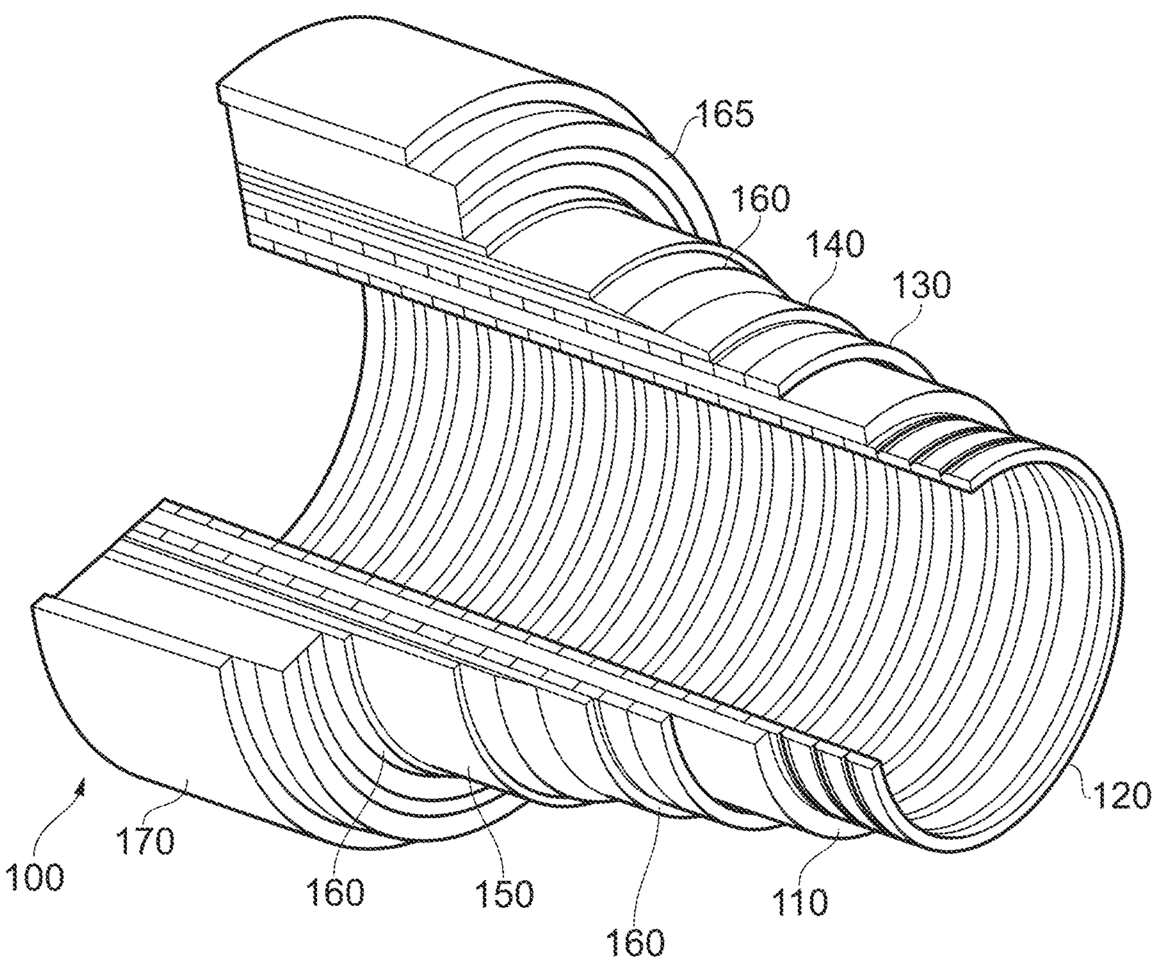
FIG. 1 illustrates a flexible pipe body.

It will be understood that the illustrated flexible pipes are an assembly of a portion of flexible pipe body and one or more end fittings in each of which a respective end of the pipe body is terminated. FIG. 1 illustrates how pipe body 100 is formed from a combination of layered materials that form a pressure-containing conduit. Although a number of particular layers are illustrated in FIG. 1, it is to be understood that certain embodiments of the present invention are broadly applicable to coaxial pipe body structures including two or more layers manufactured from a variety of possible materials. The pipe body may include one or more layers comprising composite materials, forming a tubular composite layer. It is to be further noted that the layer thicknesses are shown for illustrative purposes only. As used herein, the term “composite” is used to broadly refer to a material that is formed from two or more different materials, for example a material formed from a matrix material and reinforcement fibres.

A tubular composite layer is thus a layer having a generally tubular shape formed of composite material. Alternatively, a tubular composite layer is a layer having a generally tubular shape formed from multiple components one or more of which is formed of a composite material. The layer or any element of the composite layer may be manufactured via an extrusion, pultrusion or deposition process, or by a winding process in which adjacent windings of tape which themselves have a composite structure are consolidated together with adjacent windings. The composite material, regardless of manufacturing technique used, may optionally include a matrix or body of material having a first characteristic in which further elements having different physical characteristics are embedded. That is to say elongate fibres which are aligned to some extent or smaller fibres randomly orientated can be set into a main body or spheres or other regular or irregular shaped particles can be embedded in a matrix material, or a combination of more than one of the above. Aptly the matrix material is a thermoplastic material, aptly the thermoplastic material is polyethylene or polypropylene or nylon or PVC or PVDF or PFA or PEEK or PTFE or alloys of such materials with reinforcing fibres manufactured from one or more of glass, ceramic, basalt, carbon, carbon nanotubes, polyester, nylon, aramid, steel, nickel alloy, titanium alloy, aluminium alloy or the like or fillers manufactured from glass, ceramic, carbon, metals, buckminsterfullerenes, metal silicates, carbides, carbonates, oxides or the like.

The pipe body 100 illustrated in FIG. 1 includes an internal pressure sheath 110 which acts as a fluid retaining layer and comprises a polymer layer that ensures internal fluid integrity. The layer provides a boundary for any conveyed fluid. It is to be understood that this layer may itself comprise a number of sub-layers. It will be appreciated that when a carcass layer 120 is utilised the internal pressure sheath is often referred to by those skilled in the art as a barrier layer. In operation without such a carcass (so-called smooth bore operation) the internal pressure sheath may be referred to as a liner. A barrier layer 110 is illustrated in FIG. 1.

It is noted that a carcass layer 120 is a pressure resistant layer that provides an interlocked construction that can be used as the innermost layer to prevent, totally or partially, collapse of the internal pressure sheath 110 due to pipe decompression, external pressure, and tensile armour pressure and mechanical crushing loads. The carcass is a crush resistant layer. It will be appreciated that certain embodiments of the present invention are thus applicable to ‘rough bore’ applications (with a carcass). Aptly the carcass layer is a metallic layer. Aptly the carcass layer is formed from stainless steel, corrosion resistant nickel alloy or the like. Aptly the carcass layer is formed from a composite, polymer, or other material, or a combination of materials and components. The carcass layer is usually radially positioned within the barrier layer.

The carcass layer is a “layer” in the sense that a radially innermost and outermost surface are created in single pass at a single manufacturing node. The single manufacturing node may include multiple tape handling sections axially close together so that they are effectively a single node. The node aptly extends over an axial distance of less than 2.5 m. Aptly the node has a length of 1 m or less.

The pipe body includes a pressure armour layer 130 that is a pressure resistant layer that provides a structural layer that increases the resistance of the flexible pipe to internal and external pressure and mechanical crushing loads. The layer also structurally supports the internal pressure sheath. Aptly as illustrated in FIG. 1 the pressure armour layer is formed as a tubular layer. Aptly for unbonded type flexible pipe the pressure armour layer consists of an interlocked construction of wires with a lay angle close to 90°. Aptly in this case the pressure armour layer is a metallic layer. Aptly the pressure armour layer is formed from carbon steel, aluminium alloy, stainless steel or the like. Aptly the pressure armour layer is formed from a pultruded composite interlocking layer. Aptly the pressure armour layer is formed from a composite formed by extrusion or pultrusion or deposition. A pressure armour layer is positioned radially outside an underlying barrier layer.

The flexible pipe body illustrated also includes a first tensile armour layer 140 and second tensile armour layer 150. Each tensile armour layer is used to sustain tensile loads and optionally also internal pressure. Aptly for some flexible pipes the tensile armour windings are metal (for example steel, stainless steel or titanium or the like). For some composite flexible pipes the tensile armour windings may be polymer composite tape windings (for example provided with either thermoplastic, for instance nylon, matrix composite or thermoset, for instance epoxy, matrix composite). For unbonded flexible pipe the tensile armour layer is formed from a plurality of wires (to impart strength to the layer) that are located over an inner layer and are helically wound along the length of the pipe at a lay angle typically from about 10° to 55°. Aptly the tensile armour layers are counter-wound in pairs. Aptly the tensile armour layers are metallic layers. Aptly the tensile armour layers are formed from carbon steel, stainless steel, titanium alloy, aluminium alloy or the like. Aptly the tensile armour layers have a microstructure that consists of orientated lamellae. Aptly the tensile armour layers are formed from a composite, polymer, or other material, or a combination of materials.

Aptly the flexible pipe body includes optional layers of tape 160 which help contain underlying layers and to some extent prevent abrasion between adjacent layers. A tape layer may optionally be a polymer or composite or a combination of materials, also optionally comprising a tubular composite layer. Tape layers can be used to help prevent metal-to-metal contact to help prevent wear. Tape layers over tensile armours can also help prevent "birdcaging" of the tensile armour wires.

The flexible pipe body also includes optional layers of insulation 165 and an outer sheath 170, which comprises a polymer layer used to protect the pipe against penetration of seawater and other external environments, corrosion, abrasion and mechanical damage. Any thermal insulation layer helps limit heat loss through the pipe wall to the surrounding environment. An annulus 180 is a region associated with the space between the internal pressure sheath 110 and the outer sheath 170. In other words, in the flexible pipe body illustrated in FIG. 1, the pressure armour layer 130, the first tensile armour layer 140, the further tensile armour layer 150, the optional layers of tape 160, and the optional layers of insulation 165 are located in the annulus region 180. It will be appreciated that in some embodiments, the annulus region 180 may contain any or none of the layers present in the flexible pipe body illustrated in FIG. 1.

Each flexible pipe comprises at least one portion, referred to as a segment or section, of pipe body 100 together with an end fitting located at least one end of the flexible pipe. A respective end fitting may be used to terminate each end of the flexible pipe body. An end fitting provides a mechanical device which forms the transition between the flexible pipe body and a connector. The different pipe layers as shown, for example, in FIG. 1 are terminated in the end fitting in such a way as to transfer the load between the flexible pipe and the connector.

Figure 2:
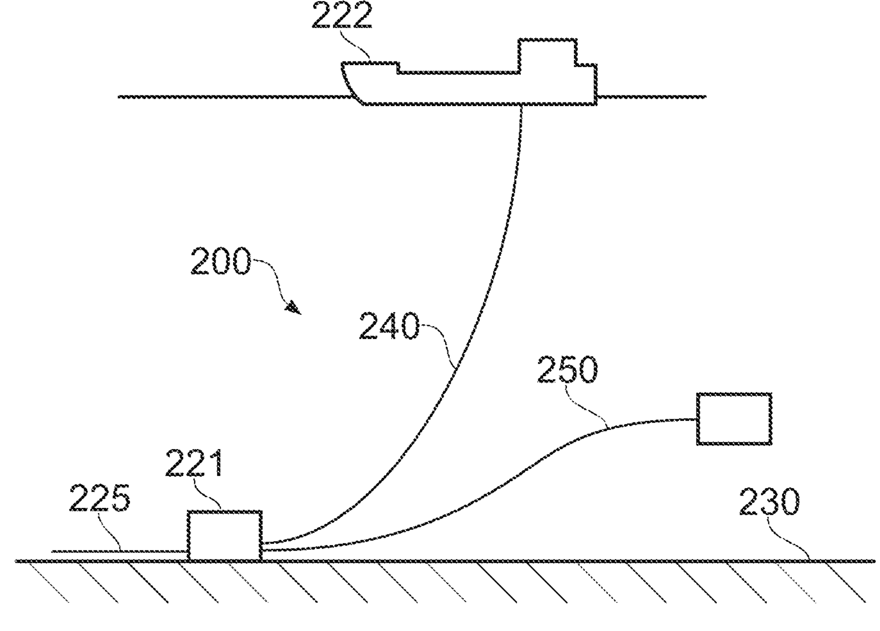
FIG. 2 illustrates certain uses of a flexible pipe.

FIG. 2 illustrates a riser assembly 200 suitable for transporting production fluid such as oil and/or gas and/or water from a sub-sea location 221 to a floating facility 222. For example, in FIG. 2 the sub-sea location 221 includes a sub-sea flow line 225. The flexible flow line 225 comprises a flexible pipe, wholly or in part, resting on the sea floor 230 or buried below the sea floor and used in a static application. The floating facility may be provided by a platform and/or buoy or, as illustrated in FIG. 2, a ship. The riser assembly 200 is provided as a flexible riser, that is to say a flexible pipe 240 connecting the ship to the sea floor installation. The flexible pipe may be in segments of flexible pipe body with connecting end fittings.

It will be appreciated that there are different types of riser, as is well-known by those skilled in the art. Certain embodiments of the present invention may be used with any type of riser, such as a freely suspended (free-hanging, catenary riser), a riser restrained to some extent (buoys, chains), totally restrained riser or enclosed in a tube (I or J tubes). Some, though not all, examples of such configurations can be found in API 17J. FIG. 2 also illustrates how portions of flexible pipe can be utilised as a jumper 250.

Figure 3:
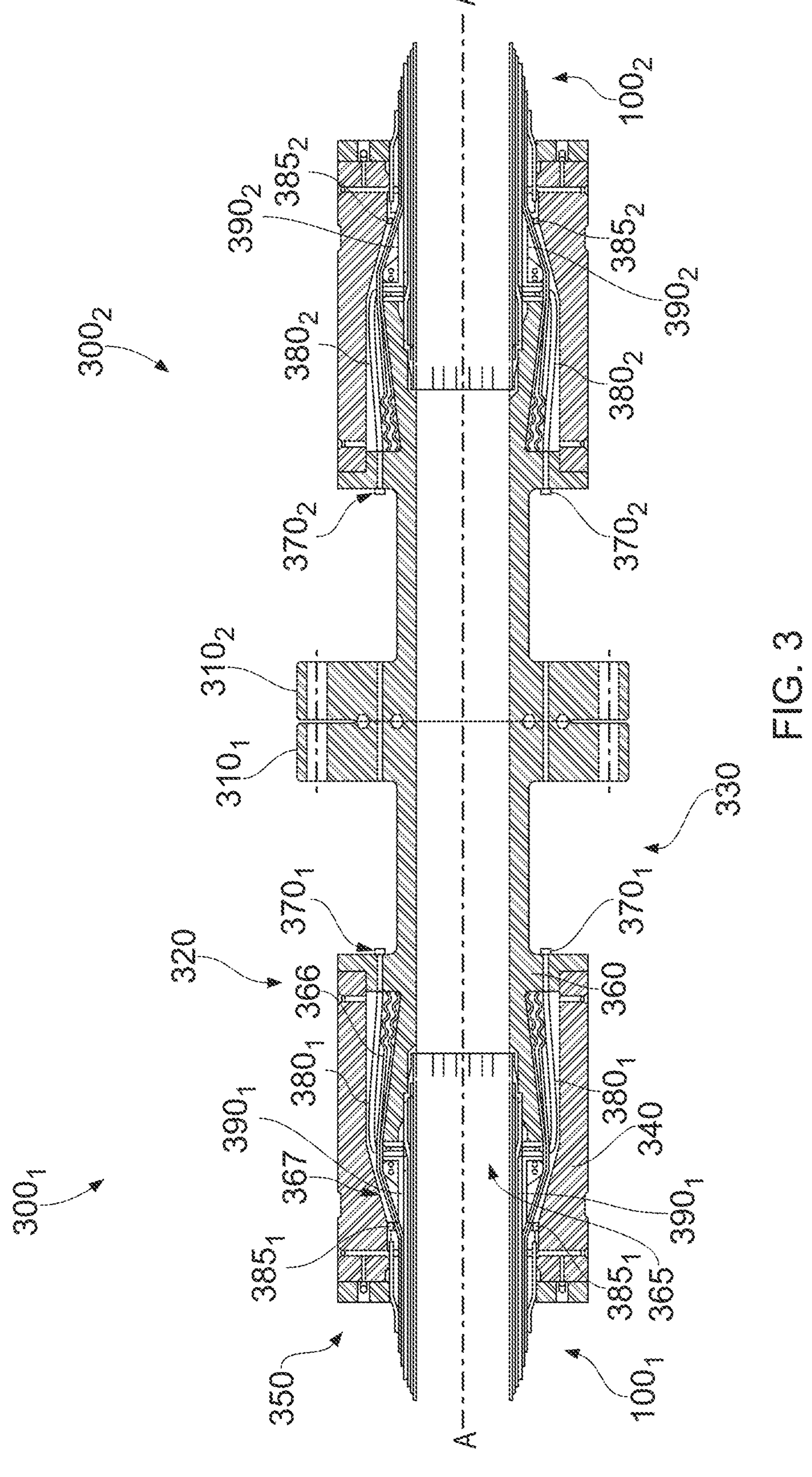
FIG. 3 illustrates an end fitting of a flexible pipe in which a segment of flexible pipe body is terminated.

FIG. 3 illustrates a first (left-most in FIG. 3) end fitting $\mathbf{300}_1$ and a further (right-most) end fitting $\mathbf{300}_2$ arranged in a back-to-back arrangement. The first end fitting $\mathbf{300}_1$ terminates a respective end of a first segment of flexible pipe body $\mathbf{100}_1$ and the further end fitting $\mathbf{300}_2$ terminates a respective end of a further segment of flexible pipe body $\mathbf{100}_2$. It will be understood that a still further end fitting may terminate a remaining end of the first segment of flexible pipe body $\mathbf{100}_1$ or a remaining end of the further segment of flexible pipe body $\mathbf{100}_2$. The end fittings $\mathbf{300}_1$, $\mathbf{300}_2$ are connected together via respective connector flanges $\mathbf{310}_1$, $\mathbf{310}_2$. These are bolted together via bolts (not shown in FIG. 3) and have matching seal ring grooves on opposing flange faces.

Each end fitting 300 further includes a central flange 320 spaced apart from the connector flange 310 via a neck region 330. An outer jacket 340 is secured to the central flange and an outer collar 350 is secured to the jacket 340 and seals against an outer surface of an outer sheath 170 of the flexible pipe body 100 via at least one seal ring. A radially innermost surface of the jacket 340 is spaced apart from a radially outer surface of a generally cylindrical but slightly flared outwards end of an elongate end fitting body 360 of the end fitting. An open mouth 365 of the end fitting body faces associated the segment of flexible pipe body. Tensile armour wires 366 are terminated in the tapered space 367 between the outer casing and the end fitting body. Aptly epoxy is located in the tapered space to entomb the ends of the tensile armour wires 366. The end fitting 300 is associated with a central longitudinal axis A-A and the central longitudinal axis of each end fitting is aligned along a common line when the end fittings are arranged in a back-to-back configuration. During use production fluids are transported along a bore provided by the barrier layer or liner of the flexible pipe body and the inner surface of each end fitting 300.

The end fittings $\mathbf{300}_1$, $\mathbf{300}_2$ illustrated in FIG. 3 also each include a respective purge valves $\mathbf{370}_1$, $\mathbf{370}_2$. It will be appreciated the purge valves are fluidly connected to the annulus region of each respective flexible pipe via respective internal tubes $\mathbf{380}_1$, $\mathbf{380}_2$ that are not filled with epoxy and thus provide a fluid communication pathway of the end fittings that extends between respective purge valves and annulus regions of the flexible pipes. Aptly the respective end fittings may not include purge valves and/or internal tubes.

FIG. 3 also illustrates how the end fittings $\mathbf{300}_1$, $\mathbf{300}_2$ each include a profiled ring $\mathbf{385}_1$, $\mathbf{385}_2$ that is an example of an annular element. The profiled rings $\mathbf{385}_1$, $\mathbf{385}_2$ are located radially around a region of a portion of respective tensile armour 366 wires that are located in the tapered space 367 or cavity of each end fitting $\mathbf{300}_1$, $\mathbf{300}_2$. FIG. 3 helps illustrates how an outer surface region of each of the profiled rings $\mathbf{385}_1$, $\mathbf{385}_2$ abuts against an outer surface region of the respective tensile armour wires 366. FIG. 3 also shows how each of the end fittings 300$_1$, 300$_2$ includes an inner collar member 390$_1$, 390$_2$ that is located radially within or beneath the tensile armour wires 366. The inner collar members include a respective abutment surface that acts to abut against an outer surface region of respective tensile armour wires 366, on an opposite side of the wires 366 to the side that is in contact with a respective profiled ring 385$_1$, 385$_2$. Thus, respective tensile armour wires 366 are gripped between a respective profiled ring 385$_1$, 385$_2$ and inner collar member 390$_1$, 390$_2$. This will be described in more detail with respect to FIG. 4.

Figure 4:
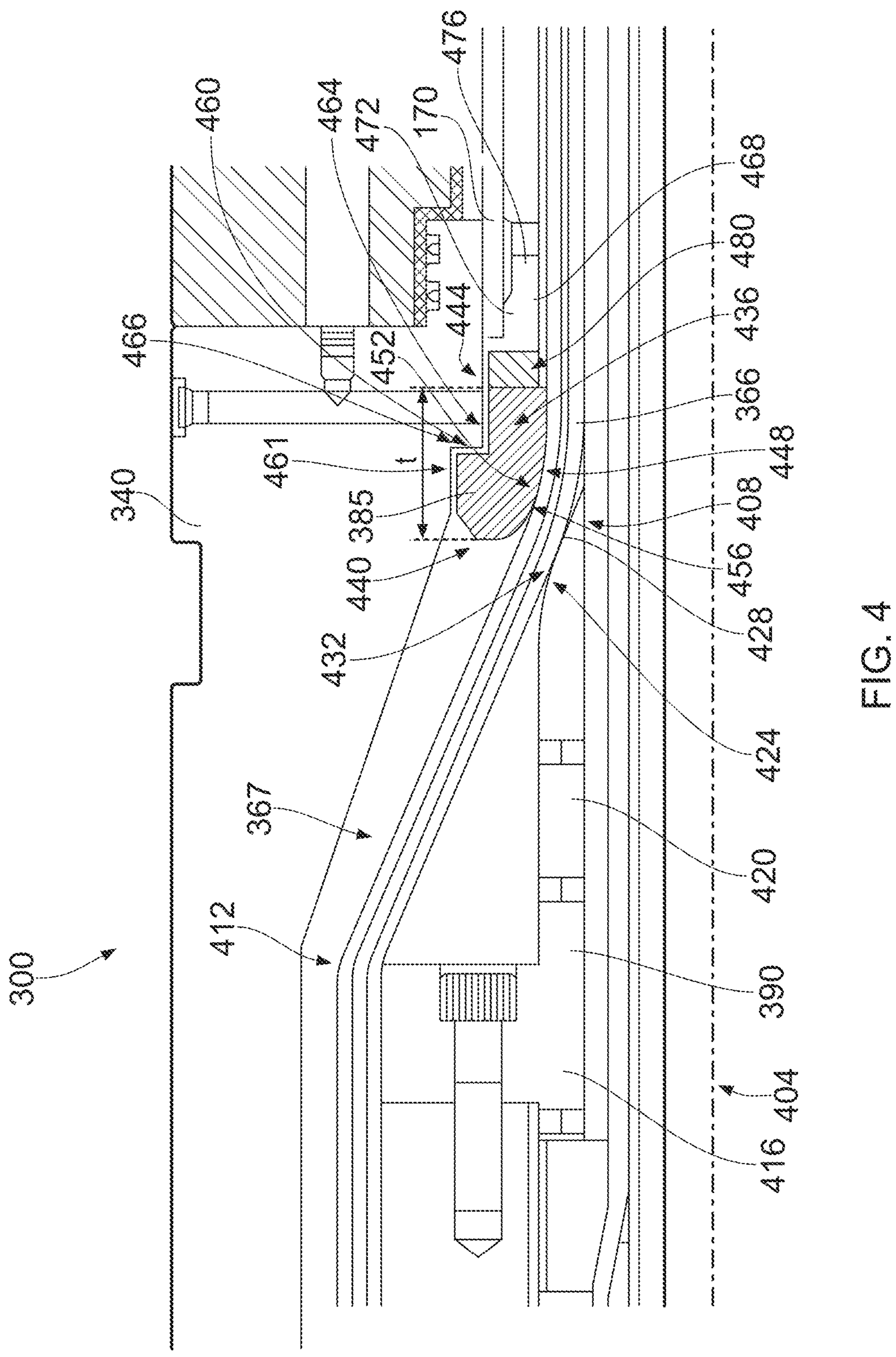
FIG. 4 illustrates a region of an end fitting of a flexible pipe in more detail.

FIG. 4 illustrates a cross-sectional view of a region of an end fitting 300 in more detail. FIG. 4 illustrates how a region of respective tensile armour wires are located in an internal tapered space 367 when a segment of flexible pipe body is terminated in an end fitting. It will be understood that the cavity 367 is located in between the end fitting jacket and the end fitting body 360. It will be appreciated that the cavity 367 is filled with epoxy resin, or any other suitable fixent, to help secure the tensile armour wires 366 in the end fitting cavity 367. As is shown in FIG. 4, the tensile armour wires are bent away from a longitudinal axis of the flexible pipe 404 at a lift-off point 408 that is an example of a predetermined location. This is a location in the end fitting 300 wherein the tensile armour wires 366 bend away from the longitudinal axis 404 of the flexible pipe. As is shown in FIG. 4, then tensile armour wires 366 bend back towards the longitudinal axis 404 of the flexible pipe at a further location 412 and thus extend over an inner collar body portion 416 of the inner collar member 390 and also over an outer surface region of the end fitting body 360.

FIG. 4 shows how the inner collar member also includes an inner collar neck portion 420 that extends away from the inner collar body portion 416 (towards the lift-off point 408) and has a reduced thickness relative to the inner collar body portion 420. As shown in FIG. 4, an end region 424 of the inner collar neck region 420, that is distal from the inner collar body portion 416, includes a tapered surface 428 that is an abutment surface. FIG. 4 shows how the abutment surface 428 abuts against a radially inner outer surface region 432 of the tensile armour wires 366 at or around the lift-off point 408. It will be understood that the radially innermost tensile armour wires 366 extend over the tapered abutment surface 428.

FIG. 4 also helps illustrates how the profiled ring 385 is arranged radially around a region of the tensile armour wires 366, and in particular is arranged radially around the radially outermost tensile armour wires 366. It will be understood that FIG. 4 illustrates a portion the profiled ring 385 in cross section. As shown in FIG. 4, the profiled ring 385, that is an example of an annular element, includes a rigid annular body that is a profiled body 436 and that has a non-uniform cross section across a whole thickness t of the body extending between a first annular edge 440 and a further annular edge 444 that each are the outermost extending edges of the profiled ring 385 along the width (thickness t) of the profiled ring 385. FIG. 4 illustrates how the profiled ring 385 includes a generally arcuate guiding surface 448 that extends between the first annular edge 440 and along at least a portion of the radially inner surface of the profiled ring 385. FIG. 4 shows how an abutment region 452 of the guiding surface 448 is urged against the radially outer surface 456 of respective tensile armour wires 366. FIG. 4 illustrates how the abutment region 452 of the guiding surface 448 contacts the tensile armour wires 366 at or around the lift-off point 408. It will thus be understood how, by urging the profiled ring 385 towards and into contact with the respective tensile armour wires 366 during terminating a segment of flexible pipe body in an end fitting 300, a region of the tensile armour wires 366, that optionally is at or around the lift-off point 408, can be gripped between the abutment region 452 of the profiled ring 385 and the abutment surface 428 of the inner collar member 390. It will be appreciated how gripping the tensile armour wires 366 in the end fitting 300 in this manner prior to entombing the wires 366 in epoxy resin or the like can help reduce slack in any wires 366 and/or help provide numerous splayed-out wires 366 of a tensile armour layer in a more uniform orientation.

FIG. 4 also helps illustrate how the profiled ring 385 includes an inset or cut-out region 460 located on an upper (radially outer) region of the ring 385 and proximate to the further end region 444. The cut-out region 460 includes a stepped jacked engaging surface region 464 and cooperates with a complimentary stepped surface region 466 (or cut-out region) disposed on a radially inner surface of the end fitting jacket 340. It will be understood how the position of the stepped surface region 466 is positioned in the end fitting jacket 340 such that the engagement between the jacket stepped surface region 466 and the stepped jacket engaging surface region 464 urges the abutment region 452 of the profiled ring 385 into contact with the respective radially outermost tensile armour wires 366 and over said wires towards a predetermined position of the profiled ring. Thus, it will be appreciated how providing and securing the end fitting jacket 340 radially around the end fitting body 360 acts to slide the profiled ring 385 towards the lift-off point 408, over the radially outer surface of the outermost tensile armour wires 366, and into gripping abutment with the outermost tensile armour wires 366 at or around the lift-off point 408.

FIG. 4 further helps illustrate how the end fitting 300 includes an outer sleeve member 468 that includes an outer sleeve body portion 472 and an outer sleeve neck portion 476 that extends away from the outer sleeve body portion 472, and has a thickness that is less than that of the outer sleeve body portion 472. It will be appreciated that the outer sleeve member may comprise an outer collar member. The outer sleeve neck portion is located in a slotted position between the outer sheath 170 of the segment of flexible pipe body that is terminated in the end fitting 300 and the radially outermost tensile armour wires 366, and optionally over a tape layer 160 which over-lies the tensile armour wires 366. The outer sleeve body portion 472 of the outer sleeve member 468 is disposed in a spaced apart relationship with respect to the annular profiled ring 385. That is to say that the profiled ring 385 and the outer sleeve member 468 are separated by an internal space region 480 that is an example of a void region. It will be understood how, prior to providing and securing the end fitting jacket 340 radially around the end fitting body 360, the profiled ring 385 is locatable against or in contact with the outer sleeve member 468 and can be axially slid long the radially outermost tensile armour wires 366 towards the lift-off point 408 to provide the void region 480. This will be described in more detail below.

Figure 5:
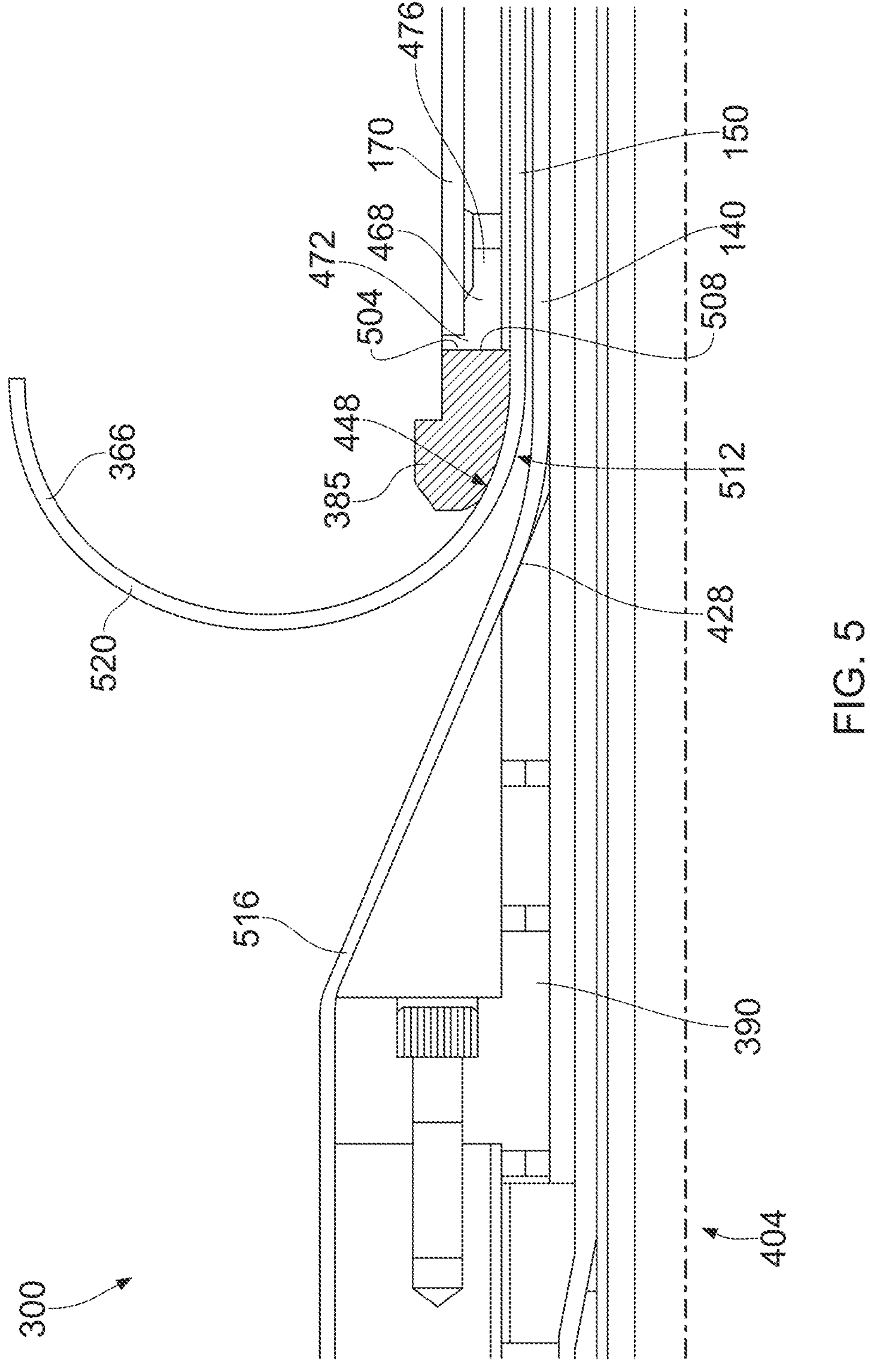
FIG. 5 illustrates how tensile armour wires can be folded during a termination process.

FIG. 5 illustrates how a profiled ring 385 can be provided in an end fitting 300 during a termination process. FIG. 5 helps illustrate how, prior to providing and securing an end fitting jacket radially around the end fitting body, and subsequent to providing the outer sleeve member 468 such that the outer sleeve neck portion 476 is located in a slotted position between the outer sheath 170 and one or more tensile armour layers 140, 150 of a segment of flexible pipe body, the profiled ring 385 is provided radially around the outermost tensile armour wires 366. That is to say that the profiled ring 385 radially surrounds an exposed region of the radially outermost tensile armour wires 366 that is revealed after trimming the outer sheath 170, and any overlying tapes 160 or other appropriate layers, during the termination process. It will be appreciated that both the profiled ring 385 and the outer sleeve member 468 are annular and radially surround the tensile armour wires 366. It will be understood that the profiled ring 385 and outer sleeve member 468 illustrated in FIG. 5 are shown only as a cross section of part of the circumference of the respective elements. FIG. 5 shows how, the profiled ring 385 is provided such that a terminal surface 504 at the further annular edge 444 of the profiled ring 385 is in contact with a terminal end 508 of the outer sleeve member 468 that is an end of the outer sleeve body portion 472 distal to the outer sleeve neck portion 476. Thus, the profiled ring is provided against, and abuts against, the outer sleeve member. Aptly the profiled ring 385 may comprise an annular protrusion which extends under the outer sheath 170, coaxially with, or alternatively incorporating what is otherwise shown in FIG. 4 as the outer sleeve body portion 472. That is to say, the profiled ring 385 may be provided with another annular recessed step, that extends radially inwards of the stepped jacket engaging surface region 464, to accommodate, and butt up against, the end of the outer sheath 170; the profiled ring 385 may then extend some distance axially under the outer sheath 170, and the terminal end surface region 504 located at the further edge 444 of the profiled ring 385 can thus be located at a position under the outer sheath 170 and proximate to the outer sleeve neck portion 476, where a terminal end 508 of the outer sleeve member 468 is can be positioned. The profiled ring 385 and the shortened outer sleeve member 468 may be inserted at the same time underneath the outer sheath 170, then the profiled ring 385 may be urged back towards the inner collar 390, separating the terminal end 508 of the outer sleeve member 468 and the terminal end surface region 504 located/locatable at the further edge 444 of the profiled ring 385 to create the internal space region 480 underneath the outer sheath 170. Such an extension of the profiled ring axially along the flexible pipe body may help to improve stability and rigidity of the profiled ring, particularly while the armour wires 366 and 516 are flexed/bent back around the profiled ring.

FIG. 5 illustrates how, as part of the termination process, the tensile armour wires 366 are bent away from the longitudinal axis 404 of the flexible pipe. That is to say that the tensile armour wires 366 are bent radially outwards and even sometimes back on themselves (as is shown in FIG. 5). This allows for certain components of an end fitting to be provided beneath the tensile armour wires 366 during termination of the segment of flexible pipe body. FIG. 4 shows how the tensile armour wires 366 are bent away from the longitudinal axis 404 of the flexible pipe along the guiding surface 448 of the profiled ring 385. As shown, the guiding surface 448 is a generally curved or arcuate outer surface of the profiled ring 385 that is a generally radially inner facing surface region, and extends over an edge, of the profiled ring 385. The guiding surface 448 thus helps determine the bending radius of a tensile armour wire 366 when the wire is bent away from the longitudinal axis 404 of the flexible pipe during the termination process, and helps ensure that the bending radius is greater than a minimum damage bending radius of the wires. This is because the tensile armour wire 366 cannot bend along the guiding surface 448 with a radius of curvature that is less than the radius of curvature of the guiding surface 448. The guiding surface has a radius of curvature which is related to the wire thickness in the tensile armour wires in a tensile armour wire layer 150 through a suitable multiplication factor which may be determined by testing of wire sizes and material grades to ensure no permanent damage nor reduction of mechanical properties of the wires result from the bending processes. Thus, the guiding surface 448 prevents the tensile armour wires 366 from being bent, away from the longitudinal axis 404 of the flexible pipe, during a termination process, to a degree that is less than the acceptable or damage minimum radius of curvature that the tensile armour wires can tolerate before potentially experiencing damage, plastic deformation and/or embrittlement. Thus, bending the tensile armour wires 366 along the guiding surface 448 helps extend the fatigue life of the tensile armour wires when terminated in an end fitting 300.

FIG. 5 shows how, due to the arrangement of the profiled ring 385 and associated guiding surface 448 the position shown in FIG. 5, each tensile armour wire 366 is bent away from the longitudinal axis 404 of the flexible pipe at a predetermined position 512 that is a wire bending or folding position. This position is determined by the outer profile of the profiled ring 385. The profiled ring thus helps more uniformly bend multiple tensile armour wires 366 during a termination process.

FIG. 5 also illustrates how, subsequent to bending the tensile armour wires away from the longitudinal axis, the inner collar member 390 is located beneath the tensile armour wires 366 and is secured in place such that the abutment surface 428 is located at or around (proximate to) the lift-off point 428 shown in FIG. 4. It will be appreciated that the inner collar member 390 is secured to the end fitting body 360, or to other suitable end fitting components, via bolts and/or screws and/or the like. Aptly the wires 366 and 516 are not permanently deformed at the predetermined position 512 when they are flexed or bent away from the longitudinal axis 404 and around the guiding surface 448, so that when the wires are bent back towards, or allowed to flex back towards (or folded back towards) the longitudinal axis 404, over the inner collar 390, the transition from their layer positions in the flexible pipe body 100 into the inner cavity 367 of the end fitting 300 is as smooth as possible.

It will be understood that subsequent to bending the tensile armour wires 366 away from the longitudinal axis 404 of the flexible pipe, and providing the requisite end fitting components such as the inner collar member 390, the tensile armour wires 366 are bent back towards or allowed to flex back towards (or folded back towards) the longitudinal axis 404 of the flexible pipe so that the innermost tensile armour wires 366 are splayed out over the abutment surface 428 of the inner collar member 390. Optionally the wires are splayed out but spaced apart from the abutment surface. It will also be understood that FIG. 5 illustrates tensile armour wires 516 of a first layer 140 that have been allowed to flex (or have been bent back towards) the longitudinal axis 404 of the flexible pipe and tensile armour wires 520 of a further layer 150 that are bent away from the longitudinal axis 404 of the flexible pipe.

Figure 6:
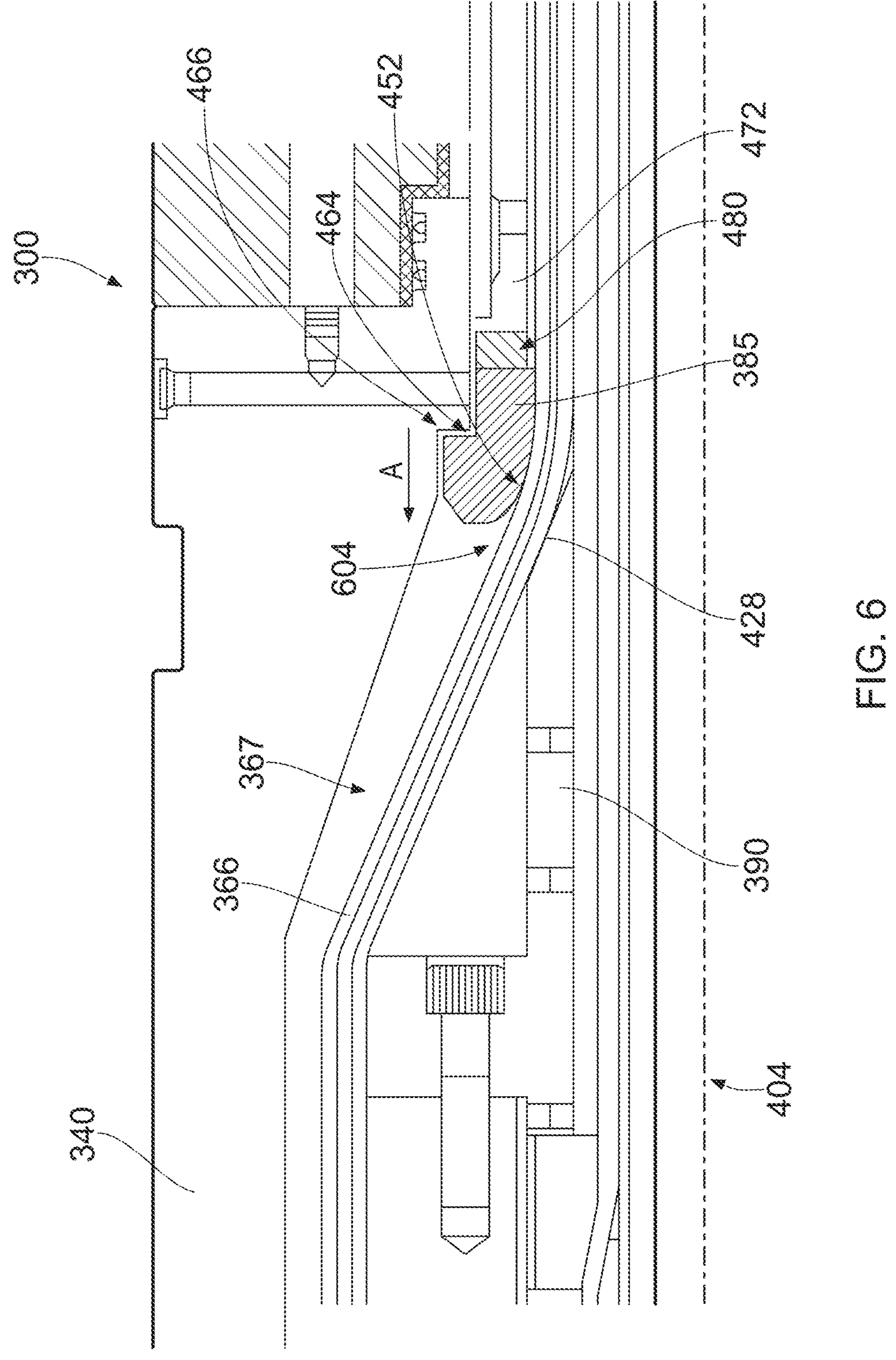
FIG. 6 helps illustrate how tensile armour wires can be clamped between an annular element and an inner collar member during a termination process.

FIG. 6 illustrates how, from the arrangement shown in FIG. 5, tensile armour wires 366 can be gripped at an end region 604 of each of the tensile armour wires 366 that is a region located towards the terminal end of the tensile armour wires 366 located within the end fitting 300 at or proximate to the lift-off point 428. The wires are gripped between the abutment region 452 of the profiled ring 385 and the abutment surface 428 of the inner collar member 390. As is shown in FIG. 6, the profiled ring 385 has been slid, relative to the position shown in FIG. 5, in a first direction of motion A (that is away from the outer sleeve member (or more particularly away from the body portion 472 of the outer sleeve member) and towards the lift-off point 408) over a portion of the outer tensile armour wires 366 that extend substantially parallel with the longitudinal axis 404 of the flexible pipe and urged into abutment with a portion of the radially outermost tensile armour wires 366 that are splayed out at or proximate to the lift-off point 408. As the profiled ring 385 is urged/slid away from the outer sleeve body portion 472, the void 480 is provided between the profiled ring 385 and the outer sleeve member 385. The void in FIG. 6 is empty space however it will be appreciated that the void 480 may be filled with any suitable material, for example by epoxy resin or the like, subsequent to sliding the profiled ring away from the outer sleeve member. This could be achieved by providing a curable material, for example epoxy resin or the like, into the void region 480 via one or more inlet ports disposed in the end fitting 300.

FIG. 6 illustrates how an end fitting jacket 340 is secured radially around the end fitting body 360. As described with reference to FIG. 4, a stepped or doglegged jacket engaging surface region 464 of the profiled ring 385 engages with a corresponding stepped, doglegged or cut-out region 466 of the outer jacket 340 located on the radially inner surface of the jacket 340. This engagement between the stepped region 466 of the jacket and the stepped jacket engaging surface region 464 of the profiled ring acts to urge the abutment region of the profiled ring into abutment with the radially outer most tensile armour wires and effectively locks the profiled ring in place at a desired position. Thus is will be appreciated that by specific positioning the respective jacket cut-out region 466 and stepped jacket engaging surface region (alongside use of a specifically shaped and sized profiled ring 385 and inner collar member 390 respectively), a predetermined gripping or clamping force can be provided on the tensile armour wires 366 at the end region 604 between the abutment region (of the profiled ring) 452 and the abutment surface 428 (of the inner collar member). It will be appreciated how the tensile armour wires 366 of multiple tensile armour layers are squeezed, gripped and/or clamped together between the abutment surface 428 of the inner collar member 390 and the abutment region 452 of the profiled ring 385 due to the compressing abutment of the abutment surface 428 of the inner collar member 390 against the radially innermost tensile armour wires 366 and the compressing abutment of the abutment region 452 of the profiled ring 385 against the radially outermost tensile armour wires 366. It will be appreciated that, if only a single tensile armour layer is present, the tensile armour wires are clamped between the inner collar member 390 and profiled ring 385 by compressing abutment of the abutment surface 428 of the inner collar member 390 on the radially inner surface of the tensile armour wires and the compressing abutment of the abutment region 452 of the profiled ring 385 on the radially outermost surface of the tensile armour wires.

It will be understood that the profiled ring 385 may be slid away from the outer sleeve body portion 472 either prior to providing the outer jacket 340 to the end fitting 300 or during providing the jacket 340 to the end fitting 300 (via the cooperative abutment between the cut-out region 466 of the jacket 340 and the stepped jacket engaging surface region 464 of the profiled ring 385).

It will be appreciated that the gripping or clamping of the tensile armour wires 366 between the profiled ring 385 and inner collar member 390 can help provide a substantially fluid tight sealing of the inner cavity 367 of the end fitting 300. The abutment surface 428 of the inner collar member 390 and/or the abutment region 452 of the profiled ring 385 may include a polymeric material or the like to further enhance this sealing effect. It will be appreciated that an initial deformable filler or sleeve or film or tape (not shown) may be introduced between the armour wires 516 of layer 140 and the armour wires 366 of layer 150 at the predetermined position 512 while the armour wires 366 are bent away from the longitudinal axis 404 and after the wires 516 have been bent back towards, or allowed to flex back towards (or folded back towards) the longitudinal axis 404, over the inner collar 390, such that when the profiled ring 385 is urged towards the inner collar member 390 the filler or sleeve or film or tape is squeezed and moulds around the tensile armour wires, at least partly filling the void spaces between them, to then solidify or harden in situ so as to provide essentially rigid support to the armour wires. It will be appreciated that such a filler or sleeve or film or tape may also be applied as an expanding filler material which takes on the shape of and at least partly fills the gaps between the profiled ring, the armour wires and the inner collar member and then solidifies or hardens in situ. It will be appreciated that this sealing effect can help prevent epoxy resin or the like from flowing out of the inner cavity of an end fitting when filling the cavity with epoxy resin (to entomb and secure the tensile armour wires in the end fitting) in a horizontal filling mode of operation (filling via fluid inlets in the end fitting that are substantially parallel to the longitudinal axis of the flexible pipe).

Aptly the profiled ring is slid away from the outer sleeve member by between a quarter of an inch and an inch, optionally by around half an inch, during terminating a segment of flexible pipe body in an end fitting.

Figure 7:
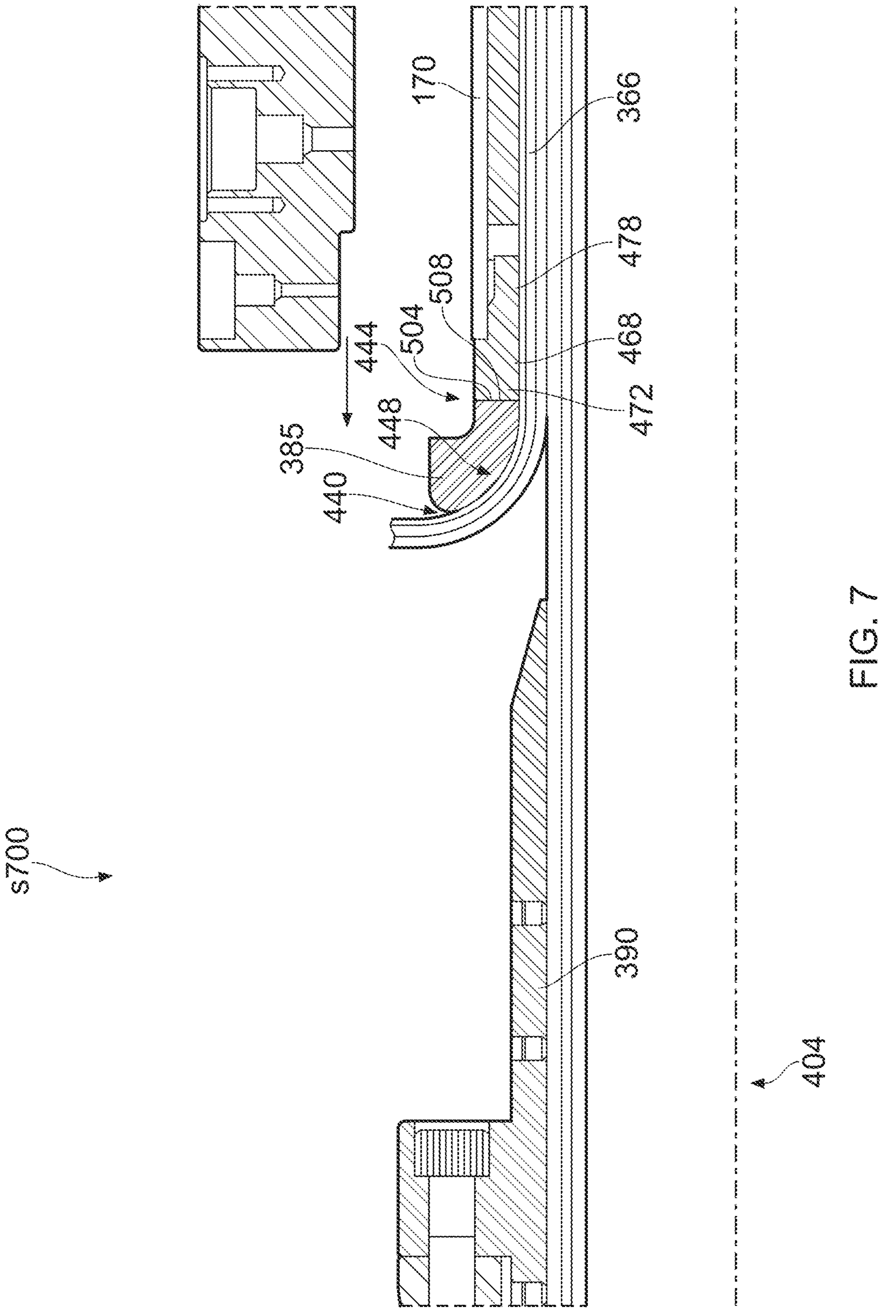
FIG. 7 illustrates a first step of gripping tensile armour wires during a process of terminating a segment of flexible pipe body in an end fitting.

FIG. 7 illustrates a first step s700 of gripping tensile armour wires 366 during a process of terminating a segment of flexible pipe body in an end fitting. That is to say that FIG. 7 illustrates a first step of locating respective end regions of wires of an armour layer of a segment of flexible pipe body at respective desired positions in an end fitting. With similarity to FIG. 5 and the associated description, FIG. 7 illustrates how, during a termination step of a segment of flexible pipe in an end fitting, an outer sleeve member 468 including an outer sleeve body portion 472 and an outer sleeve neck portion 476 is provided such that the outer sleeve neck portion is slotted between an outermost layer of tensile armour wires 366 and a flexible pipe outer sheath 170. That is to say that the outer sleeve member sleeve 468 is located radially around a portion of the radially outermost tensile armour wires 366. A profiled ring 385 is provided radially around a portion of the outermost tensile armour layers and is disposed in contact, in an end-to end configuration, with a terminal end of the outer sleeve member 508 (at the outer sleeve body portion 472) via a terminal end surface region 504 of the profiled ring 385 located at the further edge 444 of the profiled ring 385.

FIG. 7 illustrates how the tensile armour wires 366 are bent away from the longitudinal axis 404 of the flexible pipe over a guiding surface 448 of the profiled ring 385 that is a generally arcuate surface extending over a substantially radially inner face of the profiled ring 385 from the first edge 440 of the profiled ring to the further edge of the profiled ring 444. As described with respect to FIG. 5, the generally arcuate guiding surface 448 helps ensure that the radius of curvature of the tensile armour wires 366 when bent away from the longitudinal axis 404 of the flexible pipe is not less than a minimum damage bend radius of the tensile armour wires 366. FIG. 7 also helps illustrate how, by bending the tensile armour wires away from the longitudinal axis 404 of the flexible pipe, the inner collar member 390 can be provided in a location that will be radially within the tensile armour wires 366 when the wires 366 are positioned back over the inner collar member 390.

Figure 8:
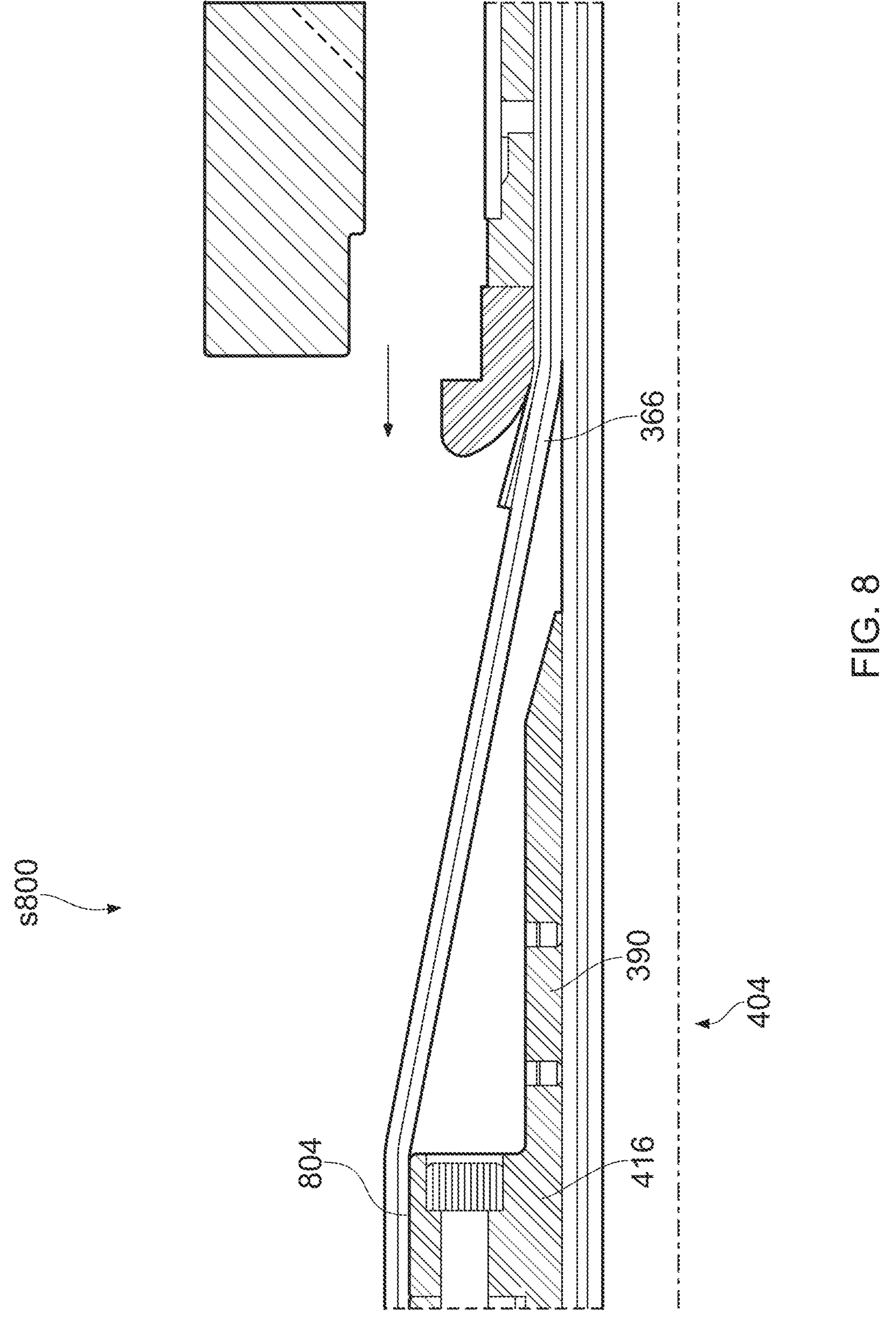
FIG. 8 illustrates a second step of gripping tensile armour wires during a process of terminating a segment of flexible pipe body in an end fitting.

FIG. 8 illustrates a second step s800 of gripping tensile armour wires 366 during a process of terminating a segment of flexible pipe body in an end fitting. That is to say that FIG. 8 illustrates a second step of locating respective end regions of wires of an armour layer of a segment of flexible pipe body at respective desired positions in an end fitting. As is shown in FIG. 8, the tensile armour wires have bent back towards, or have been allowed to flex towards, the longitudinal axis 404 of the flexible pipe and are arranged to extend over a radially outer surface 804 of the inner collar body portion 416 of the inner collar member 390.

It will be appreciated that the bending radius of the profiled ring guiding surface is designed to be greater than a minimum bend radius of tensile armour wires utilised in flexible pipes to avoid overbending of the wires.

Figure 9:
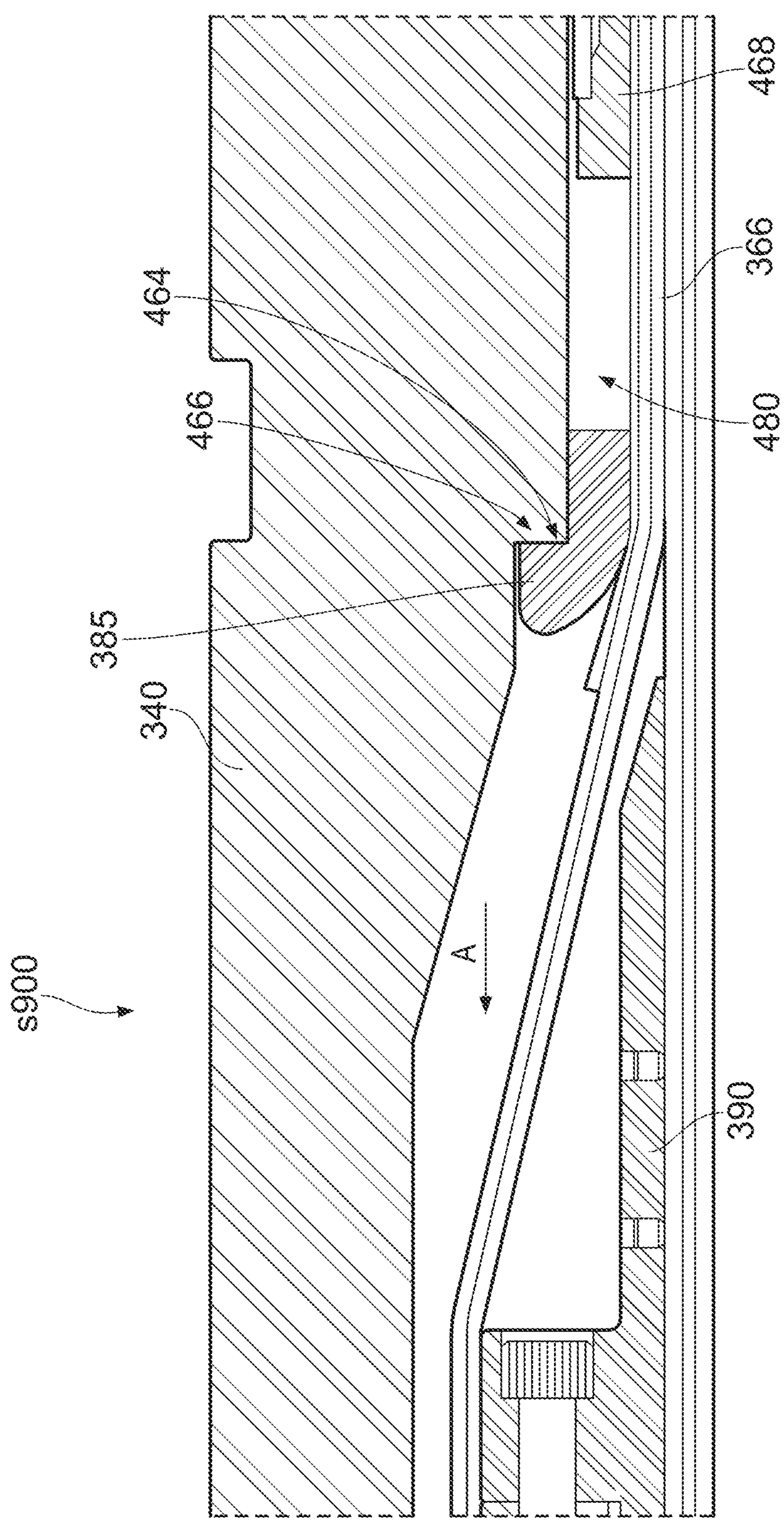
FIG. 9 illustrates a third step of gripping tensile armour wires during a process of terminating a segment of flexible pipe body in an end fitting.

FIG. 9 illustrates a third step s900 of gripping tensile armour wires 366 during a process of terminating a segment of flexible pipe body in an end fitting. That is to say that FIG. 9 illustrates a third step of locating respective end regions of wires of an armour layer of a segment of flexible pipe body at respective desired positions in an end fitting. As shown in FIG. 9, an end fitting jacket 340 is slid radially over the end fitting body 360 (and radially around the portion of tensile armour wires 366 to be terminated in the end fitting, radially around the outer sleeve member, radially around the inner collar member 390 and radially around the profiled ring 385). As is illustrated in FIG. 9, the cut-out or stepped region 466 of the end fitting jacket 340 (located on the radially inner surface of the jacket 340) has be slid into engaging abutment with the complimentary stepped jacket engaging surface region 464 of the profiled ring 385 (that is located on a radially outward edge region of the profiled ring 385). FIG. 9 shows how, due to the engagement between the profiled ring 385 and the end fitting jacket 340, as the end fitting jacket is slid over the end fitting body 360 in a first direction A, the profiled ring 385 is slid over the radially outermost tensile armour wires 366 in the first direction A. Thus, the profiled ring 385 is slid away from, and is axially spaced apart from, the outer sleeve member 468. FIG. 9 illustrates how a void region 480 is provided between the profiled ring and the outer sleeve member.

It will be appreciated that the shaped profile of the rebated region (or inset region) of the end fitting jacket inner surface (that is an example of a first engagement surface region) cooperates with the jacket engagement surface of the profiled ring that is provided by the inset region of the profiled ring. The jacket and profiled ring thus include cooperative mating surfaces. It will be understood that the generally stepped profile of the rebated region of the jacket and the jacket engaging surface of the annular ring ensures that, when the end fitting is assembled and the end fitting jacket is slid over the end fitting body, the profiled ring is urged axially along the tensile armour wires but is not urged radially inwardly and thus is not compressed or forced inwardly. This thus helps prevent damage to the tensile armour wires in end fitting assembly.

Figure 10:
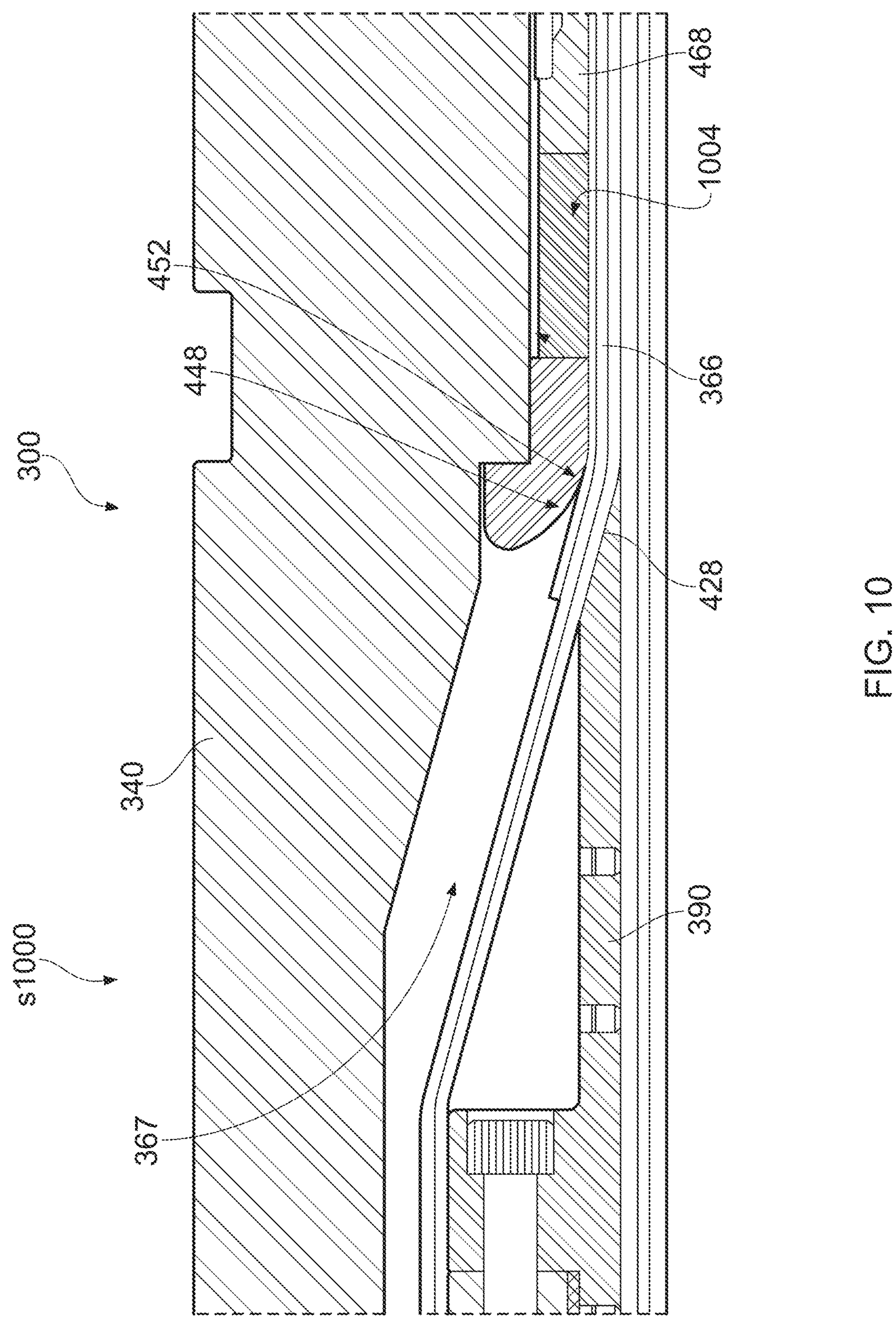
FIG. 10 illustrates a fourth step of gripping tensile armour wires during a process of terminating a segment of flexible pipe body in an end fitting.

FIG. 10 illustrates a fourth step s1000 of gripping tensile armour wires 366 during a process of terminating a segment of flexible pipe body in an end fitting. That is to say that FIG. 10 illustrates a fourth step of locating respective end regions of wires of an armour layer of a segment of flexible pipe body at respective desired positions in an end fitting. FIG. 10 illustrates how the end fitting jacket 340 has been slid further over the end fitting body 360 relative to the position shown in FIG. 9. Thus, the profiled ring has been slid further towards the inner collar member (and axially in a first direction away from the outer sleeve member), over the radially outermost tensile armour wires relative to the position shown in FIG. 9. FIG. 10 shows how an abutment region 452 (that is a portion of the guiding surface 448) of the profiled ring 385 abuts against a radially outer surface of each of the radially outermost tensile armour wires 366 when the profiled ring 385 is located in the position shown in FIG. 10. FIG. 10 also shows how the position of the profiled ring 385 urges the tensile wires 366 into such a position that the radially inner surface of each of the radially innermost tensile armour wires abut against the abutment surface 428 of the inner collar member 390. It will be appreciated that the various tensile armour layers of the flexible pipe and wires included therein are squeezed together between the profiled ring 385 and the inner collar member 390 to thereby clamp or grip the tensile armour wires 366 between the inner collar member and the profiled ring. It will be understood that the end fitting jacket 340 is secured to the end fitting body in the position shown in FIG. 10 to thereby lock the profiled ring 385 in place.

As shown in FIG. 10, the void region is filled with suitable material 1004 to help provide reinforcement to the portion of flexible pipe body located in this region. As discussed previously, this may be a curable material such as epoxy resin or the like. Alternatively, a split body ring member may be provided between the profiled ring 385 and the outer sleeve member 468. It will be understood that subsequent to the step s1000 shown in FIG. 10, the inner cavity 367 of the end fitting 300 may be filled with a curable material, for example epoxy resin, to entomb the tensile armour wires 366.

It will be appreciated that the size of the respective stepped cross sectional surface regions of the jacket and profiled ring are predesigned such that the ring is properly engaged by the jacket and to ensure a predetermined pre-tension is applied to the tensile wires when the profiled ring is urged against the wires.

As shown in FIG. 9, when the tensile armour wires are splayed out over the end fitting body (after being folded back towards the longitudinal axis of the flexible pipe), a gap is present between the abutment surface 428 of the inner collar member and the radially innermost tensile armour wires. It will thus be appreciated how, by sliding the profiled ring over the outermost tensile armour wires, the tensile armour wires are forced towards and into contact with the abutment surface of the inner collar member. It will thus be understood how, by urging the profiled ring over the wires in this manner, a degree of axial loading is applied to the tensile armour wires which helps reduce any slack in the tensile armour wires and helps orient the wires in a more uniform manner. This also helps reduce the variation of stresses imparted on the tensile armour wires in use.

Figure 11A:
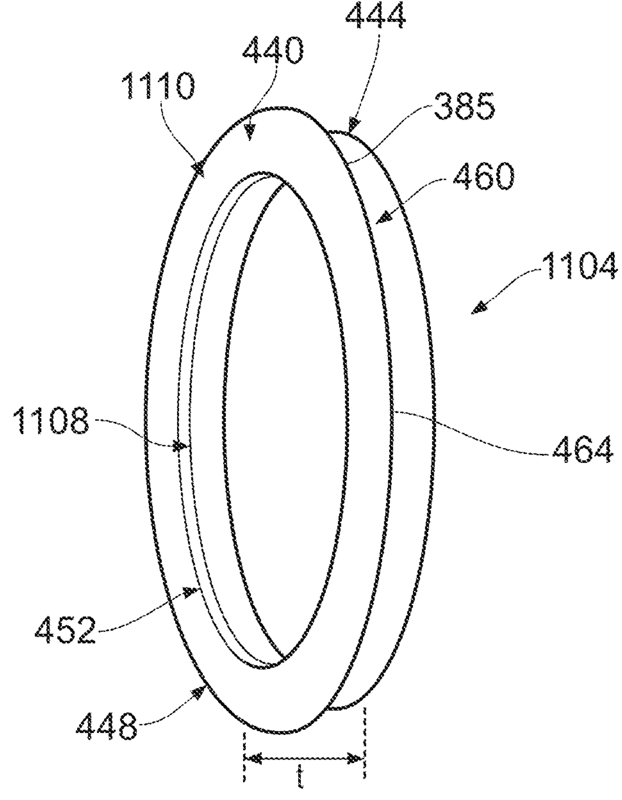
FIG. 11*a* illustrates a perspective view of an annular element in more detail

FIG. 11*a* illustrates the profiled ring 385 of FIGS. 4 to 10 in more detail. As shown in FIG. 11*a*, the profiled ring 385 includes a first edge 440 and a further edge 444 that is spaced apart from the first edge 440 across an entire width of the ring 385. The first edge 440 and the further edge 444 are outwardly most extending edges of the profiled ring and thus define a thickness of the profiled ring 385 cross section. It will be understood that the profiled ring 385 has a non-uniform cross section profile along its thickness (that is to say across the width w of the profiled ring 385). The cross section of the profiled ring however is substantially constant along the whole circumference of the annular body 1104, that is a rigid annular body, of the profiled ring (that is to say around the ring of the annular body 1104). Optionally the annular body 1104 may be non-rigid or at least partly deformable. The radially inner edge region 1108 of the annular body 1104, that extends between the first and further edges 440, 444, includes a generally arcuate guiding surface 448. As described with respect to FIG. 5, the guiding surface 448 is a surface upon which tensile armour wires can be folded or bent away from a longitudinal axis of a flexible pipe during termination of a segment of flexible pipe body. It will be appreciated that the radius of curvature of the guiding surface 448 is greater than the minimum damage bend radius of tensile armour wires to help prevent damage to tensile armour wires during folding.

FIG. 11*a* also illustrates how the guiding surface 448 includes an abutment region 452 that in use is for urging into contact with a radially outer surface of at least some tensile armour wires of a flexible pipe to help impart a predetermined tension (and optionally grip) the tensile armour wires in an end fitting to thereby help increase the uniformity of tensile armour wires terminated in an end fitting. It will be appreciated that this helps reduce a variation in the amount of stress imparted on each wire. FIG. 11*a* shows how the abutment region 452 is disposed on a substantially radially inner region of the guiding surface 448, but is more proximate to the first edge 440 than the further edge 444.

FIG. 11*a* also illustrates how a radially outer region of the profiled ring 385, proximate to the further edge 444, includes a cut-out region (or inset region) 460 that extends to the further edge 444. Thus, the profiled ring 385 includes a flared-out region 1110 proximate to the first edge 440 and located on a radially outermost edge region of the ring 385. It will be understood that the cut-out region 460 provides the stepped jacket engaging surface region 464 of the profiled ring 385 for engaging with an end fitting jacket in use.

The profiled ring 385 of FIG. 11*a* is made from a metallic material. It will be appreciated that the profiled ring may be instead made from a polymeric material or a ceramic material or a composite material or any other suitable material. The profiled ring is a rigid body. Optionally the profiled ring may not be rigid and may be flexible or semi-flexible.

Figure 11B:
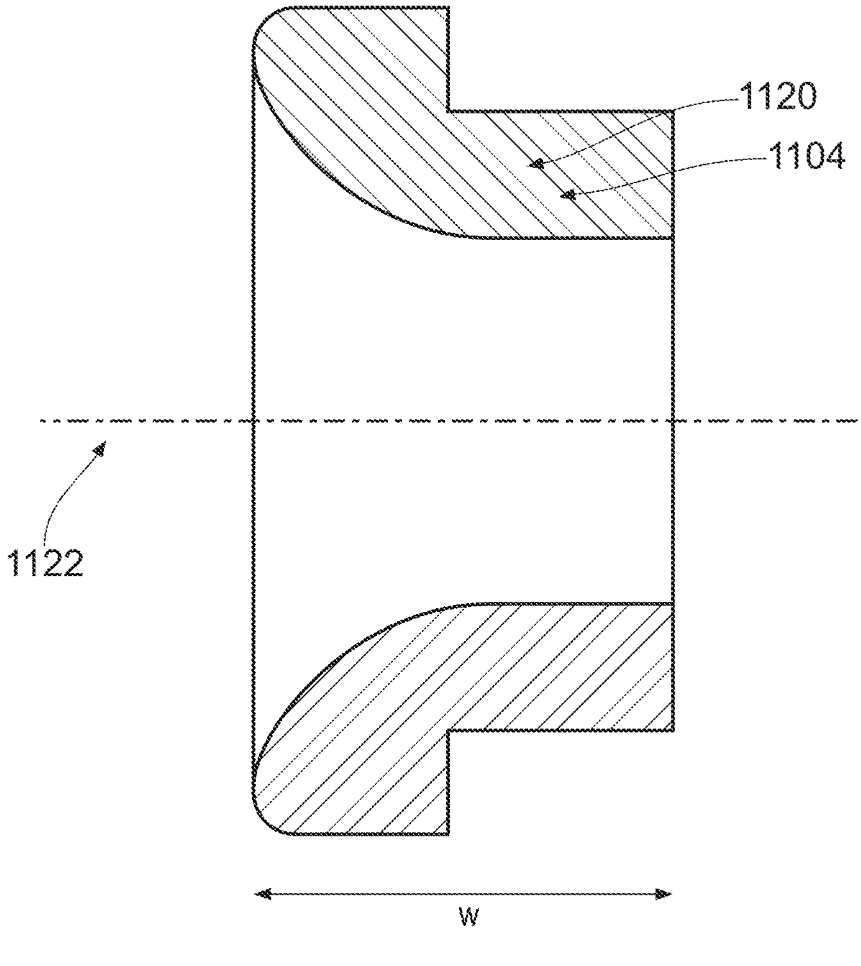
FIG. 11*b* illustrates a perspective view of the body of the annular element of FIG. 11*a* in cross section.

FIG. 11*b* illustrates the cross-sectional profile of the profiled ring of FIG. 11*a* across its width w. It will be appreciated that the width w of the profiled ring 385 may instead be referred to as its thickness or whole thickness. FIG. 11*b* helps illustrate how the cross section 1120 of the profiled ring is substantially constant around the of the annular body 1104 of the profiled ring 385. That is to say that the cross section is substantially constant around the whole of the circumference of the annular body. Optionally, the cross section of the annular body may of course not be substantially constant around its circumference and may include or of more circumferential regions in which the cross section 1120 varies.

FIG. 11*b* illustrates how the profiled ring 385 is a rigid annular body 1104 that extends circumferentially around a central axis 1122. It will be appreciated that the radially inner surface of the profiled ring may include one or more low friction regions to help aid the profiled ring in sliding along tensile armour wires during terminating a segment of flexible pipe in an end fitting. It will be understood that the width or thickness of the profiled ring extends along, or is parallel to, the central axis.

Figure 11C:
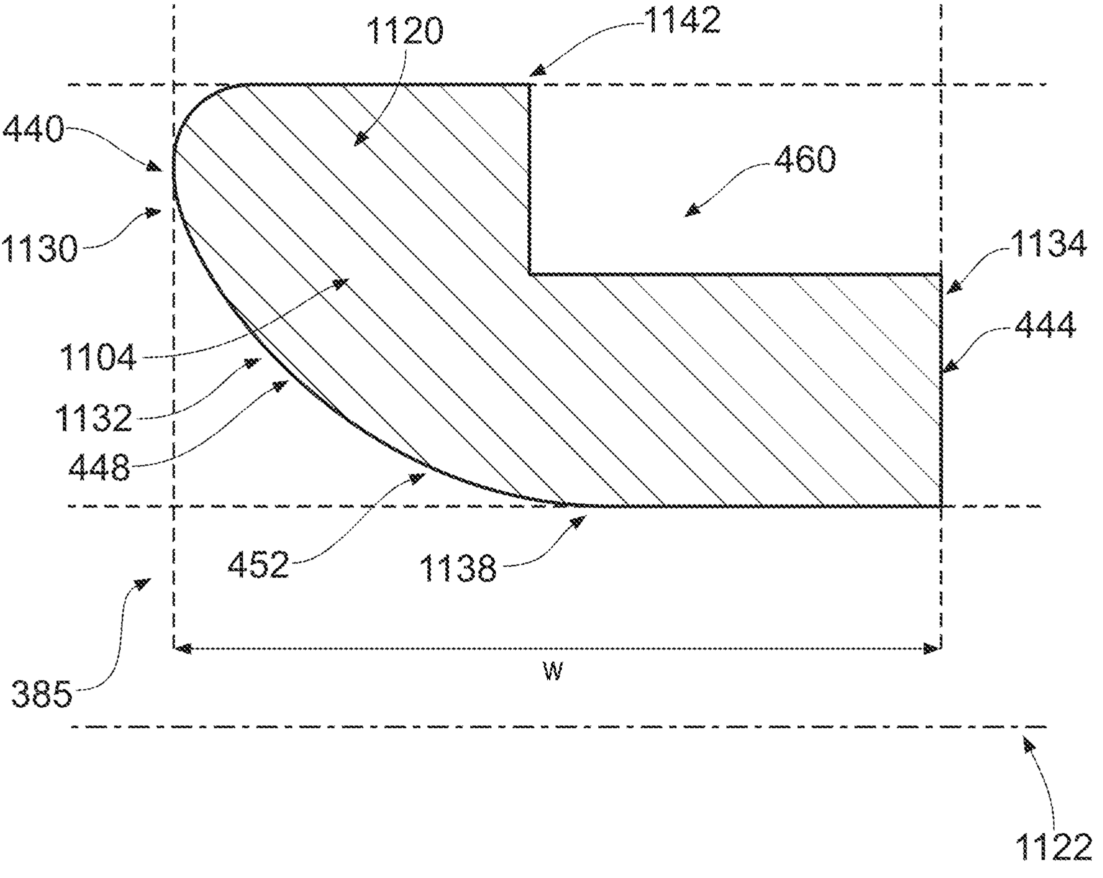
FIG. 11*c* illustrates a perspective view of the cross sectional profile of the annular element of FIG. 11*a* in more detail.

FIG. 11*c* illustrates the cross section 1120 of the rigid annular body 1104 (of the profiled ring 385) in more detail. The cross section 1120 shown in FIG. 11*c* is a cross section of the annular body along the central axis 1122. The cross section includes a first end region 1230 and a further end region 1234 that is spaced apart from the first end region along the central axis 1122. The cross section further includes a radially inner edge region 1138 and a radially outer edge region 1142 that are radially spaced apart and that are connected between the first end region 1130 and the further end region 1134. As shown in FIG. 11*c*, the cross section 1120 is generally curved at the first end region 1130. The first end region includes a first extremity end (or first annular edge) 440 that is a terminal end point of the width w of the annular body 1104 and the further end region includes a further extremity end 444 (or a further extremity end region that is a further annular edge) that is a remaining terminal end of the width w of the annular body 1104. FIG. 11*c* shows how a guiding surface 448, in cross section, extends at least partly along the radially inner edge region 1138 and along the first end region 130 of the rigid annular body 1104. The guiding surface 448 includes a generally arcuate bend limiting surface portion 1132 upon which tensile armour wires can be bent away from a longitudinal axis of a flexible pipe during terminating a segment of flexible pipe body in an end fitting, and which limits the curvature of said tensile armour wires to be above a minimum bend radius associated with the wires due to the arcuate shape of the bend limiting surface portion. It will be appreciated that the bend limiting surface portion is a substantially convex surface. It will be appreciated that the guiding surface 448 also includes the abutment region 425 which is a region of the rigid annular body for abutting against a plurality of tensile armour wires of a tensile armour layer of a flexible pipe in use.

FIG. 11*c* illustrates how the annular body 1104 includes a radially inset region 460 located on the radially outer edge region 428 and that extends from the further extremity end 444 (towards the first extremity end 440). It will be appreciated that the inset region is an example of a jacket engaging portion. The inset region 460 provides a jacket engaging surface 464 (that is an example of an engaging surface and in FIG. 11*c* is a recessed jacket engaging surface or a stepped jacket engaging surface). It will be appreciated that the jacket engaging surface region cooperates with a mating inner surface region of an end fitting jacket in use. Optionally, the jacket engaging surface region may instead be one or more radially extending protruding surface regions or elements that extend radially outwardly and engage with corresponding inner surface profiles of an end fitting jacket.

FIG. 11*c* additionally illustrates how the further end region of the annular body cross section 1120 includes the further extremity end 444. A trailing surface, that is a collar abutment surface, for abutting against an end fitting outer sleeve member during a tensile armour wire folding/bending process in use is, in cross section, located on the further end region 134. It will be appreciated that the trailing surface is a substantially planer surface.

Figure 11D:
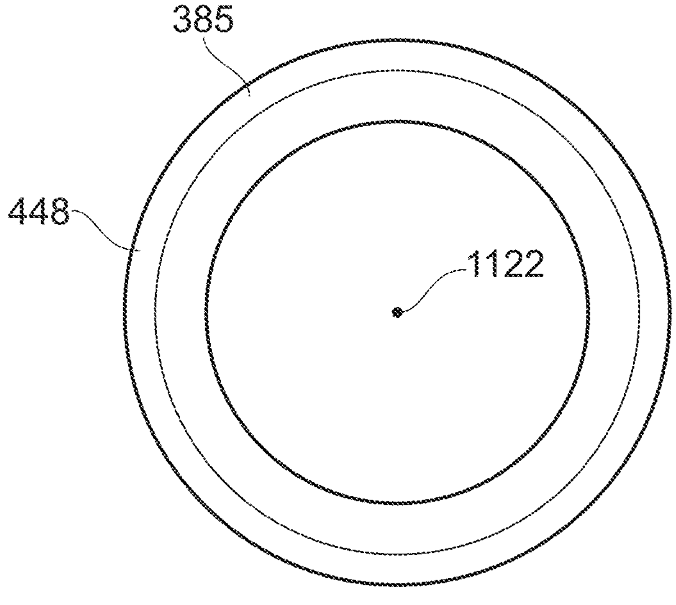
FIG. 11*d* illustrates another perspective view of the annular element of FIG. 11*a;*

FIG. 11*d* illustrates another perspective view of the profiled ring of FIGS. 4 to 10. FIG. 11*d* helps illustrate how the profiled ring 385 extends circumferentially around the central axis 1122. FIG. 11*d* also helps illustrate how the profiled ring 385 includes a guiding surface that is generally curved or arcuate and extends over the first end (that faces out of the page from the perspective view shown in FIG. 11*d*) of the profiled ring 385. It will be appreciated how tensile armour wires can be splayed out over the first end of the profiled ring (and other proximate regions of the ring) during terminating a segment of flexible pipe body in an end fitting.

Figure 11E:
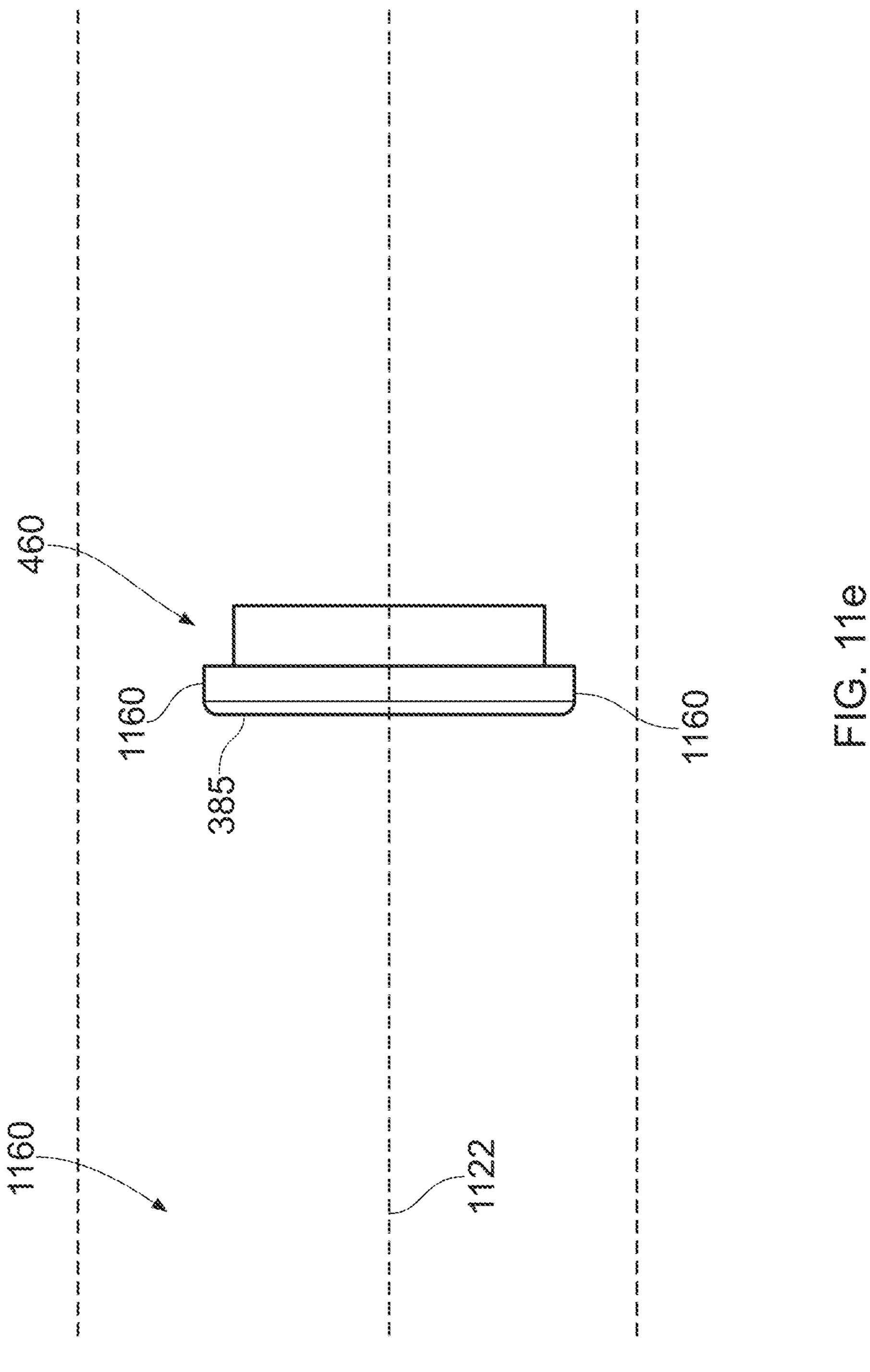
FIG. 11*e* illustrates a different perspective view of the annular element of FIG. 11*a;*

FIG. 11*e* illustrates a side-on perspective view of the profiled ring 385 of FIGS. 4 to 10. FIG. 11*e* illustrates how the profiled ring is arranged around a central axis 1122 that extends on (or along) an imaginary plane 1160. It will be understood how the imaginary plane shown 1122 in FIG. 11*e* is one of an infinite number of imaginary planes on which the central axis extends. FIG. 11*e* also shows how the profiled ring 385 intersects the imaginary plane 1160 at two positions 1160 around the circumference of the profiled ring. It will be appreciated that the cross section illustrated in FIG. 11*c* is the cross section of the respective intersection positions 1160 (one of the positions having a cross section that is inverted with respect to the viewpoint shown in FIG. 11*c*). FIG. 11*e* also helps illustrate how the inset regions 460 for abutting against an end fitting jacket in use are arranged on the profiled ring.

Figure 11F:
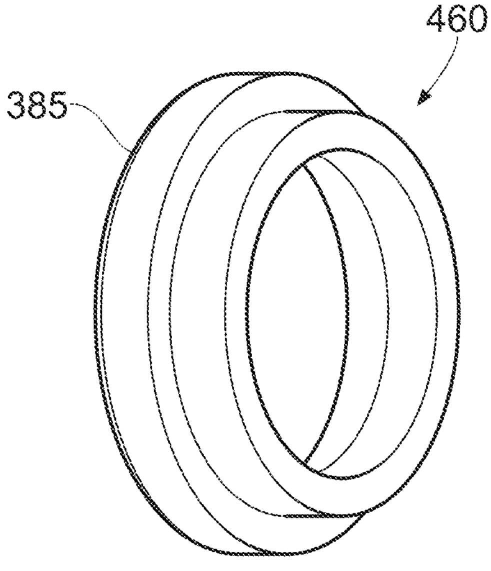
FIG. 11*f* illustrates yet another perspective view of the annular element of FIG. 11*a*.

FIG. 11*f* illustrates a further perspective view of the profiled ring 385 of FIGS. 4 to 10. FIG. 11*f* helps further illustrate how the profiled ring includes an inset region 460 that is disposed on an outer annular edge of the ring and extends from a further end of the ring. It will be appreciated how the profiled ring is an example of a rigid annular body.

Figure 12:
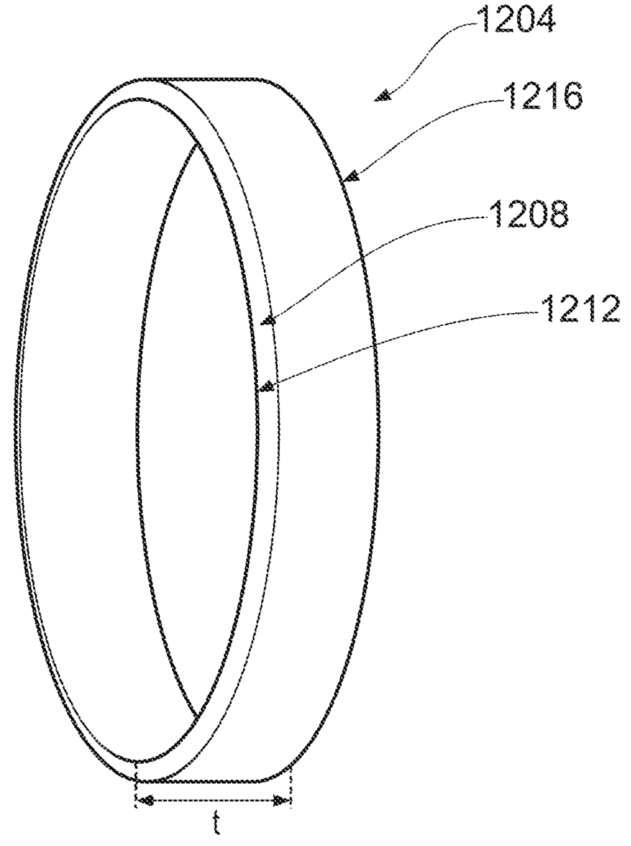
FIG. 12 illustrates a perspective view of a further annular element.

FIG. 12 illustrates a different annular element that is a substantially uniform ring element 1204. That is to say that the ring 1204 of FIG. 12 has a cross section that is substantially uniform or symmetrical across a whole width or thickness t of the ring element 1204. It will be appreciated that the ring element 1202 of FIG. 12 is similar to the profiled ring 385 of FIGS. 11*a*, 11*b* and 11*c* and thus functions in a similar manner as the profiled ring 385 (to help grip tensile armour wires in an end fitting). The ring element 1204 of FIG. 12 thus includes a guiding surface 1208 and an abutment region 1212 that is similar to the corresponding profiles in FIGS. 11*a*, 11*b* and 11*c*. The ring element of FIG. 12 however does not include a cut-out region (that is shown in FIGS. 11*a*, 11*b* and 11*c*). Thus, the ring element 1204 of FIG. 12 must either be manually urged and secured against tensile wires in use, or an end fitting jacket can abut against a terminal edge region 1216 of the ring element 1204 in a similar manner to how an end fitting jacket can abut against the jacket engaging surface region shown in FIGS. 11*a*, 11*b* and 11*c*.

Throughout the description and claims of this specification, the words "comprise" and "contain" and variations of them mean "including but not limited to" and they are not intended to (and do not) exclude other moieties, additives, components, integers or steps. Throughout the description and claims of this specification, the singular encompasses the plural unless the context otherwise requires. In particular, where the indefinite article is used, the specification is to be understood as contemplating plurality as well as singularity, unless the context requires otherwise.

Features, integers, characteristics or groups described in conjunction with a particular aspect, embodiment or example of the invention are to be understood to be applicable to any other aspect, embodiment or example described herein unless incompatible therewith. All of the features disclosed in this specification (including any accompanying claims, abstract and drawings), and/or all of the steps of any method or process so disclosed, may be combined in any combination, except combinations where at least some of the features and/or steps are mutually exclusive. The invention is not restricted to any details of any foregoing embodiments. The invention extends to any novel one, or novel combination, of the features disclosed in this specification (including any accompanying claims, abstract and drawings), or to any novel one, or any novel combination, of the steps of any method or process so disclosed.

The reader's attention is directed to all papers and documents which are filed concurrently with or previous to this specification in connection with this application and which are open to public inspection with this specification, and the contents of all such papers and documents are incorporated herein by reference.

While certain arrangements of the inventions have been described, these arrangements have been presented by way of example only, and are not intended to limit the scope of the disclosure. Indeed, the novel methods and systems described herein may be embodied in a variety of other forms. Furthermore, various omissions, substitutions and changes in the systems and methods described herein may be made without departing from the spirit of the disclosure. The accompanying claims and their equivalents are intended to cover such forms or modifications as would fall within the scope and spirit of the disclosure. Accordingly, the scope of the present inventions is defined only by reference to the appended claims.

Features, materials, characteristics, or groups described in conjunction with a particular aspect, arrangement, or example are to be understood to be applicable to any other aspect, arrangement or example described in this section or elsewhere in this specification unless incompatible therewith. All of the features disclosed in this specification (including any accompanying claims, abstract and drawings), and/or all of the steps of any method or process so disclosed, may be combined in any combination, except combinations where at least some of such features and/or steps are mutually exclusive. The protection is not restricted to the details of any foregoing arrangements. The protection extends to any novel one, or any novel combination, of the features disclosed in this specification (including any accompanying claims, abstract and drawings), or to any novel one, or any novel combination, of the steps of any method or process so disclosed.

Furthermore, certain features that are described in this disclosure in the context of separate implementations can also be implemented in combination in a single implementation. Conversely, various features that are described in the context of a single implementation can also be implemented in multiple implementations separately or in any suitable subcombination. Moreover, although features may be described above as acting in certain combinations, one or more features from a claimed combination can, in some cases, be excised from the combination, and the combination may be claimed as a subcombination or variation of a subcombination.

Moreover, while operations may be depicted in the drawings or described in the specification in a particular order, such operations need not be performed in the particular order shown or in sequential order, or that all operations be performed, to achieve desirable results. Other operations that are not depicted or described can be incorporated in the example methods and processes. For example, one or more additional operations can be performed before, after, simultaneously, or between any of the described operations. Further, the operations may be rearranged or reordered in other implementations. Those skilled in the art will appreciate that in some arrangements, the actual steps taken in the processes illustrated and/or disclosed may differ from those shown in the figures. Depending on the arrangement, certain of the steps described above may be removed, others may be added. Furthermore, the features and attributes of the specific arrangements disclosed above may be combined in different ways to form additional arrangements, all of which fall within the scope of the present disclosure. Also, the separation of various system components in the implementations described above should not be understood as requiring such separation in all implementations, and it should be understood that the described components and systems can generally be integrated together in a single product or packaged into multiple products.

For purposes of this disclosure, certain aspects, advantages, and novel features are described herein. Not necessarily all such advantages may be achieved in accordance with any particular arrangement. Thus, for example, those skilled in the art will recognize that the disclosure may be embodied or carried out in a manner that achieves one advantage or a group of advantages as taught herein without necessarily achieving other advantages as may be taught or suggested herein.

Conditional language, such as "can," "could," "might," or "may," unless specifically stated otherwise, or otherwise understood within the context as used, is generally intended to convey that certain arrangements include, while other arrangements do not include, certain features, elements, and/or steps. Thus, such conditional language is not generally intended to imply that features, elements, and/or steps are in any way required for one or more arrangements or that one or more arrangements necessarily include logic for deciding, with or without user input or prompting, whether these features, elements, and/or steps are included or are to be performed in any particular arrangement.

Conjunctive language such as the phrase "at least one of X, Y, and Z," unless specifically stated otherwise, is otherwise understood with the context as used in general to convey that an item, term, etc. may be either X, Y, or Z. Thus, such conjunctive language is not generally intended to imply that certain arrangements require the presence of at least one of X, at least one of Y, and at least one of Z.

Language of degree used herein, such as the terms "approximately," "about," "generally," and "substantially" as used herein represent a value, amount, or characteristic close to the stated value, amount, or characteristic that still performs a desired function or achieves a desired result. For example, the terms "approximately", "about", "generally," and "substantially" may be used to refer to an amount that is within less than 10% of the stated amount. As another example, in certain arrangements, the terms "generally parallel" and "substantially parallel" refer to a value, amount, or characteristic that departs from exactly parallel by less than or equal to 15°, 10°, 5°, 3°, 1 degree, or 0.1 degree. The ranges disclosed herein also encompass any and all overlap, sub-ranges, and combinations thereof, and any specific values within those ranges. Language such as "up to," "at least," "greater than," "less than," "between," and the like includes the number recited. Numbers and values used herein preceded by a term such as "about" or "approximately" include the recited numbers. For example, "approximately 7 mm" includes "7 mm" and numbers and ranges preceded by a term such as "about" or "approximately" should be interpreted as disclosing numbers and ranges with or without such a term in front of the number or value such that this application supports claiming the numbers, values and ranges disclosed in the specification and/or claims with or without the term such as "about" or "approximately" before such numbers, values or ranges such, for example, that "approximately two times to approximately five times" also includes the disclosure of the range of "two times to five times." The scope of the present disclosure is not intended to be limited by the specific disclosures of preferred arrangements in this section or elsewhere in this specification, and may be defined by claims as presented in this section or elsewhere in this specification or as presented in the future. The language of the claims is to be interpreted broadly based on the language employed in the claims and not limited to the examples described in the present specification or during the prosecution of the application, which examples are to be construed as non-exclusive.

What is claimed is:

1. Apparatus for terminating a segment of flexible pipe body in an end fitting, comprising:

an outer sleeve member of an end fitting comprising an outer sleeve body portion and an outer sleeve neck portion that extends away from the outer sleeve body portion and is secured to a portion of flexible pipe body in a slotted position between an outer sheath of the flexible pipe body and at least one armour layer of the flexible pipe body;

an inner collar member of an end fitting comprising an inner collar body portion and an inner collar neck portion that extends away from the inner collar body portion and comprises an abutment surface at an end region of the inner collar neck portion distal to the inner collar body portion; and an annular element that is spaced apart from the outer sleeve body portion via a void region and comprises an abutment region, that faces the abutment surface, disposed on a generally arcuate guiding surface of the annular element; wherein respective end regions of a plurality of wires of the armour layer are gripped between the abutment surface and the abutment region, the wires being at least partly locatable in a cavity region, that is fillable with a curable material, between an end fitting body and an end fitting jacket.

2. The apparatus as claimed in claim 1, further comprising:

the wires are at least partially immobilised between the abutment surface and the abutment region due to a predetermined gripping force being provided on each of the wires.

3. The apparatus as claimed in claim 1, further comprising:

a radius associated with the arcuate guiding surface is greater than a minimum bend radius associated with each of the wires.

4. The apparatus as claimed in claim 1, further comprising:

the arcuate guiding surface comprises an arcuate bend limiting surface portion that has a radius of curvature that is larger than a minimum bend radius associated with each of the wires.

5. The apparatus as claimed in claim 1, further comprising:

the annular element comprises a first mating surface that cooperates with a further mating surface of the end fitting jacket.

6. The apparatus as claimed in claim 5, further comprising:

cooperation of the first mating surface and the further mating surface urges the annular element axially along the wires, but does not urge the annular element radially inwardly.

7. The apparatus as claimed in claim 5, further comprising:

engagement between the first mating surface and the further mating surface urges the abutment region into gripping abutment with outermost wires of the plurality of wires.

8. The apparatus as claimed in claim 5, further comprising:

a stepped jacket engaging surface region of the annular element, that comprises the first mating surface, is disposed at a radially outer region of the annular element; and a further stepped region of the end fitting jacket, that comprises the further mating surface, is disposed on a radially inner surface of the end fitting jacket.

9. The apparatus as claimed in claim 1, further comprising:

the void region is filled with curable material, or a split body ring is provided between the annular element and the outer sleeve member.

10. The apparatus as claimed in claim 1, further comprising:

the plurality of wires of the armour layer being gripped between the abutment surface and the abutment region, and a filler or sleeve or tape disposed around and/or between the wires at least partially filling spaces between the wires, provides fluid tight sealing of the cavity region.

11. The apparatus as claimed in claim 1, further comprising:

the abutment surface and/or the abutment region comprises polymeric material.

12. The apparatus as claimed in claim 1, further comprising:

a radially inner surface of the annular element comprises at least one low friction region.

13. The apparatus as claimed in claim 1, further comprising:

the annular element comprises a metallic material and/or a polymeric material and/or a ceramic material and/or a composite material.

* * * * *